United States Patent
Nisenzon

(10) Patent No.: US 9,900,584 B2
(45) Date of Patent: Feb. 20, 2018

(54) DEPTH MAP GENERATION BASED ON CLUSTER HIERARCHY AND MULTIPLE MULTIRESOLUTION CAMERA CLUSTERS

(71) Applicant: Semyon Nisenzon, Palo Alto, CA (US)

(72) Inventor: Semyon Nisenzon, Palo Alto, CA (US)

(73) Assignee: Semyon Nisenzon, Palo Alto, CA (US)

(*) Notice: Subject to any disclaimer, the term of this patent is extended or adjusted under 35 U.S.C. 154(b) by 167 days.

(21) Appl. No.: 15/139,352

(22) Filed: Apr. 27, 2016

(65) Prior Publication Data
US 2017/0318280 A1 Nov. 2, 2017

(51) Int. Cl.
| | |
|---|---|
| H04N 13/02 | (2006.01) |
| H04N 13/00 | (2006.01) |
| H04N 5/225 | (2006.01) |
| H04N 5/247 | (2006.01) |
| G06T 3/40 | (2006.01) |

(52) U.S. Cl.
CPC ........ H04N 13/0271 (2013.01); G06T 3/40 (2013.01); H04N 5/2256 (2013.01); H04N 5/2257 (2013.01); H04N 5/247 (2013.01); H04N 13/0296 (2013.01)

(58) Field of Classification Search
CPC ................................................ H04N 13/0242
USPC ................................................. 348/48, 42
See application file for complete search history.

(56) References Cited

U.S. PATENT DOCUMENTS

| | | | | |
|---|---|---|---|---|
| 7,509,241 | B2* | 3/2009 | Guo | G06F 17/5004 345/419 |
| 8,326,084 | B1* | 12/2012 | Marrion, Jr. | G06K 9/00778 382/285 |
| 8,385,971 | B2* | 2/2013 | Rhoads | G06F 17/30244 382/162 |
| 9,679,227 | B2* | 6/2017 | Taylor | G06K 9/6292 |
| 2005/0249382 | A1* | 11/2005 | Schwab | G06K 9/00778 382/115 |
| 2010/0271511 | A1* | 10/2010 | Ma | H04N 13/0011 348/239 |
| 2010/0310155 | A1* | 12/2010 | Newton | H04N 13/0055 382/154 |

(Continued)

*Primary Examiner* — Chikaodili E Anyikire
(74) *Attorney, Agent, or Firm* — Prakash Nama; Global IP Services, PLLC

(57) ABSTRACT

Techniques for depth map generation using cluster hierarchy and multiple multiresolution camera clusters are described. In one example embodiment, the method includes, capturing images using multiple multiresolution camera clusters. Multiple low-resolution depth maps are then generated by down scaling the captured high resolution image and mid-resolution images to lower resolution images. A low-resolution central camera depth map is generated using the refined multiple low-resolution depth maps. Captured lower resolution images are then up-scaled to mid-resolution images. A mid-resolution depth map are then generated for each cluster using multiple view points and the up-scaled mid-resolution images. A high-resolution depth map is then generated using the refined initial mid-resolution depth map, the low-resolution central camera depth map, and the up-scaled central cluster images. A 3D image of the captured image is then generated using the generated high-resolution depth map and the captured low, mid and high-resolution images.

33 Claims, 19 Drawing Sheets

(56) References Cited

U.S. PATENT DOCUMENTS

2013/0215239 A1\* 8/2013 Wang ............... G06T 7/579
 348/50
2014/0007022 A1\* 1/2014 Tocino Diaz ........... G06F 3/017
 715/863

\* cited by examiner

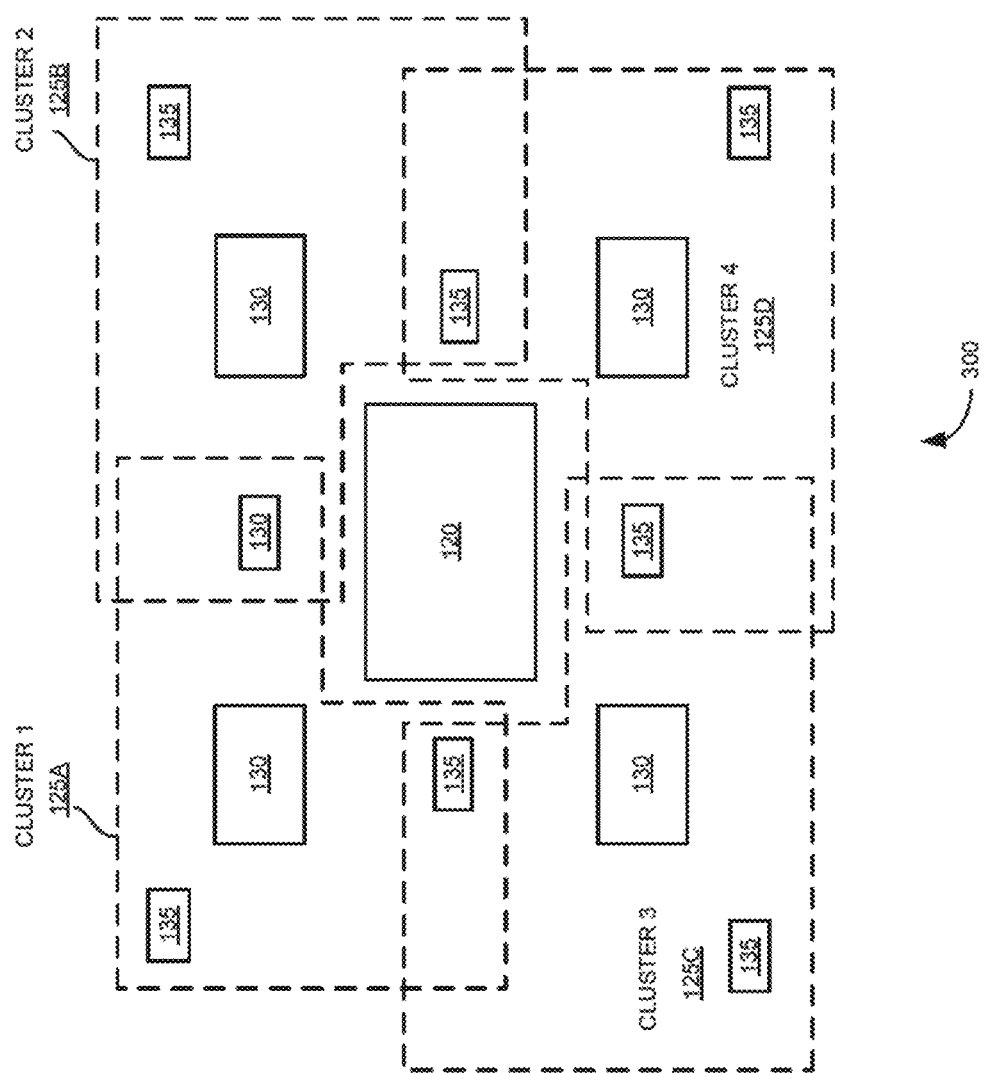

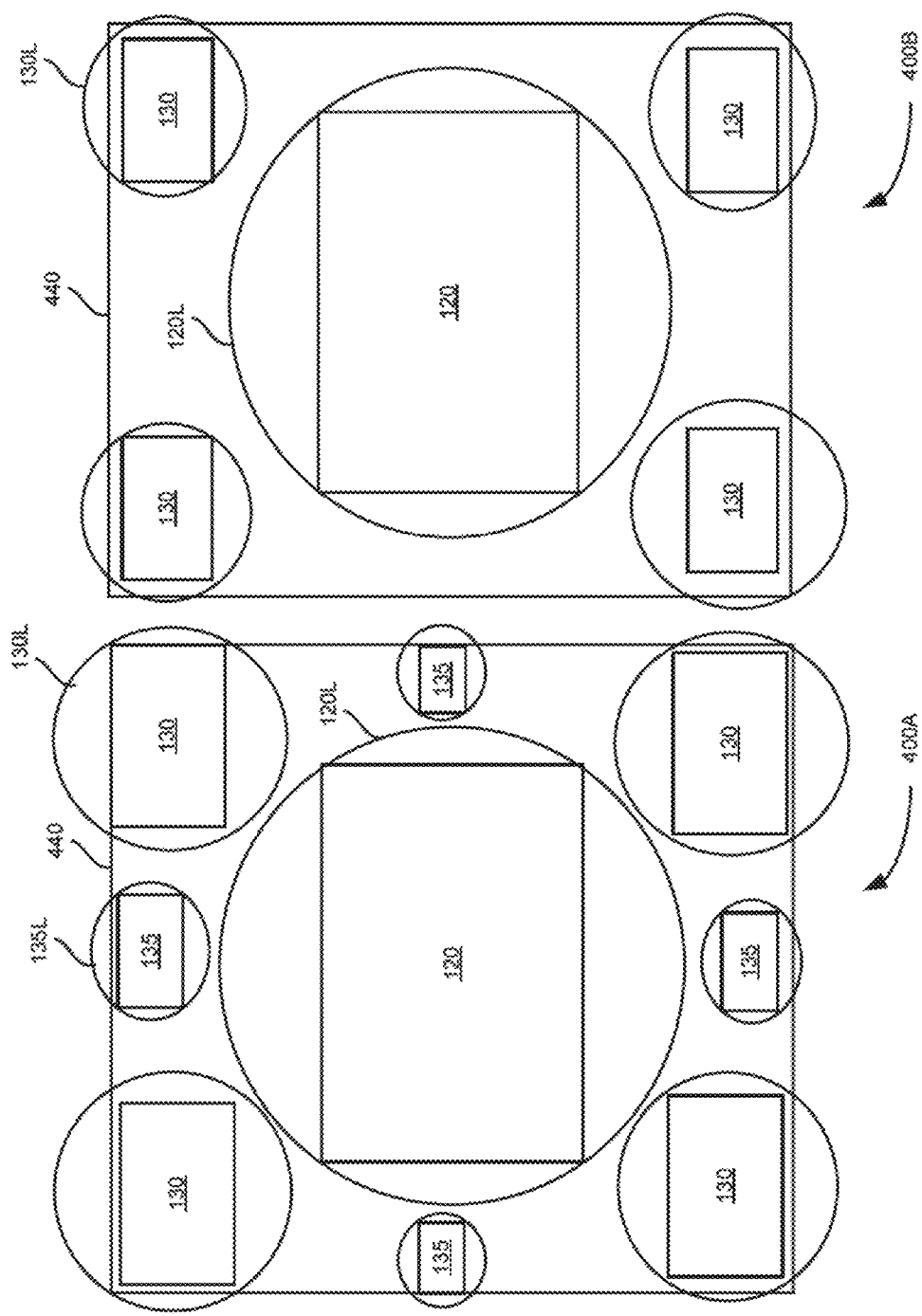

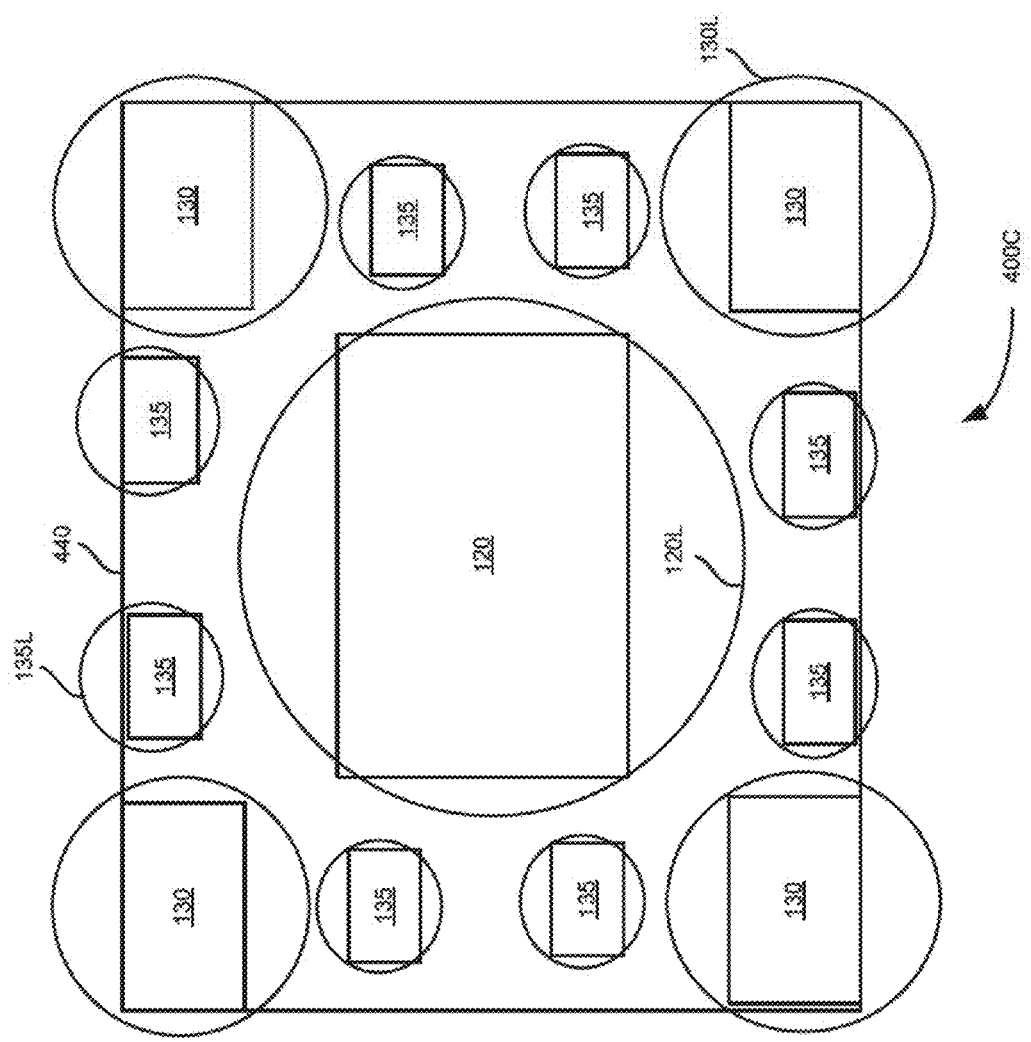

DEPTH MAP GENERATION BASED ON CLUSTER HIERARCHY AND MULTIPLE MULTIRESOLUTION CAMERA CLUSTERS

BACKGROUND

High quality, computationally-tractable depth maps and associated 3D images is a critical and essential enabler for many application markets. Two human eyes see a scene from different positions, thus giving us a sense of depth of the scene. The differences between the two views of the scene, called binocular disparity, allow our brain to calculate the depth for every point on the scene visible by the two eyes. A similar result could be achieved by using two cameras simultaneously capturing the scene and then comparing the two resulting images in order to compute depth information. This could be accomplished by moving individual pixels of one image to match pixels on another image. The degree of movement necessary, called disparity, depends on the distance from the cameras to the object resulting in the particular pixel pair, and also depends on the distance between the two cameras. The goal is to fine tune the best match of pixels from different cameras in order to calculate the most accurate depths.

There are several implementations using large number of cameras organized in two-dimensional arrays. One example implementation is Stanford Multi-Camera arrays. These arrays capture light fields defined as a set of two-dimensional (2D) images capturing light from different directions for the whole scene. Using a larger number of cameras increases the accuracy of the depth map obtained. Another example implementation of camera arrays is the Pelican Imaging system which uses set of low-resolution R, G, and B cameras positioned directly on top of image sensor chip. Both these systems are using lower resolution depth maps in order to obtain higher resolution RGB images, sometimes called super-resolution images.

For traditional cameras, depth of field depends on the so-called F ratio of the lens, which is the ratio of the focal length of the camera lens to the width of the lens aperture. Depending on the F ratio, there can be a particular range of distances from the camera on either side of the focal plane in which the image is sharp. Because a camera cluster produces three-dimensional (3D) images, which includes 2D color images plus we can compute the depth for every pixel of the image which called depth map. Using depth map and color image closed to all-in-focus it is possible to generate all in focus image. It is also possible to produce images with different synthetic aperture (level of blurring outside of in focus area), and also to control areas of the image, which are in focus (synthetic depth of field). This could be accomplished at any selected depth after the image had been shut. This feature is being called dynamic refocusing. The maximum synthetic aperture could be defined by size of camera cluster, synthetic apertures of the individual cameras as well as the accuracy of the generated depth map.

Generally, camera arrays use multiple cameras of same, resolution and as a cluster. Such camera arrays may contain information that allows generation of an output image at a resolution higher than the original cameras in the camera array, which is, typically, called as super-resolution images. Generation of super-resolution images by camera arrays have to overcome number of challenges. The most important challenges are: handling of occlusion areas, holes, accuracy and resolution of depth map, total number of computations to be performed (computational complexity), and/or occlusions.

Occlusions are one of the fundamental complications in generation of super-resolution images using camera arrays. Occlusions are the areas which are seen by some of the cameras, but are not visible from the view of the other cameras because they are in the "shadow" of the other parts of the image (other objects in the image). Depth calculation requires at least two cameras seeing the same pixel. Special handling of occluded zones requires a determination of which cameras see a particular pixel and discarding information from the camera or cameras for which this pixel is occluded. It is possible that some of the pixels are seen by only one camera, and it may be difficult to determine such pixels' depth.

Holes are parts of the image where it is not possible to determine depth map. An example is where there are flat areas in the image that do not have discernible textures, so there is no specific information within this area that will allow matching of pixels from different cameras, and therefore depth cannot be determined. The other special area is related to some special occlusion cases where there could be pixels which are visible only by central camera. For both of these cases, generation of super-resolution images will fail for some areas of the image and will create holes, which could be filled later with some level of success by quite sophisticated heuristic interpolation methods.

Some camera array techniques may include using one of the cameras as a reference camera and then for each pixel of reference camera perform parallax shift operation on other cameras in order to determine depth at this pixel. Parallax shift for any given pixel depends on actual 3D position of this pixel and the distance between the cameras. This process usually involves performing parallax shift for number of depths. Conceptually, parallax shift is performed for each of these depths for all participating cameras in the camera array and then so called "cost function" for this depth is being generated. Then the depth with the minimal cost function will be defined as the depth for this pixel. Different implementations are using number of additional techniques for final determination of pixel depth. One of the objectives of these techniques is to find absolute minimum of cost function and to avoid the use of local minimum of cost function as a final depth for given pixel.

Initial depth set may be selected to minimize computations and the final depth could be refined by repeating the depth search for the new set of depths close to initial pixel depth. At the end of this process final depth for every pixel at reference camera position (excluding holes) is being determined and depth map is being formed. The resolution of this final depth map is typically the resolution of the reference camera.

The importance of getting accurate depth map for the generation of super-resolution images cannot be overestimated. The depth map is used to superimpose all images from the camera array onto the super resolution grid. Any error in the depth map will cause the placement of pixels from other than the reference camera in the wrong position, causing image artifacts. Usually such artifacts are more visible for areas that are closer to the cameras, resulting in big disparities, because the parallax shift for pixels corresponding to them is larger. This can be especially true when a camera array consists of mono-color R, G and B cameras, because placing a color pixel at the wrong place can be highly visible to the human eye.

However, determining final depth map using existing techniques produce depth map having the same resolution of the cameras in the camera array, which is, typically, lower than the super-resolution of output image and such low-resolution depth maps may be computationally intensive and could be very expensive both in terms of the total number of parallax computations for a large number of depths, and also due to the fact that the large number of images from different cameras being used simultaneously may affect efficient memory use. Further, the use of high-resolution camera arrays may significantly increase hardware costs as well. Furthermore, existing techniques may require using laser or Time of Flight (TOF) systems that may be expensive, too big and may result in inflexible industrial design constraints.

SUMMARY

One or more embodiments disclosed herein provide a method for generating depth map based on cluster hierarchy and multiple multiresolution camera clusters. In one aspect, the method includes, capturing images using cameras in the multiple multiresolution camera clusters. Multiple low-resolution depth maps are then generated by down scaling the captured high-resolution image and mid-resolution images to lower resolution images. Further, low-resolution central camera depth is generated using the refined multiple low-resolution depth maps. Captured lower resolution images are then up-scaled to mid-resolution images. Multiple mid-resolution depth maps are then generated for each cluster using multiple view points and the up-scaled mid-resolution images. An initial mid-resolution depth map may be generated using the generated multiple mid-resolution depth maps and a down scaled high-resolution image. A high-resolution depth map is then generated using the mid-resolution depth maps, the low-resolution central camera depth map, and the up-scaled central cluster images. A high-resolution 3D image of the captured image is then generated using the generated high-resolution depth map and the captured low, mid and high-resolution images.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a computing device. The instructions, when executed in a computing device, perform the steps for depth map generation using multiple multiresolution camera clusters.

Embodiments of the present disclosure provide three example implementations of multiple multiresolution camera clusters. In the first example implementation, multiple multiresolution camera clusters are formed by using set of individual camera modules. In the second example implementation, individual camera modules consisting of lenses and sensors are disassembled and placed in two separate specially machined holders: one for all lenses and one for all sensors. Then these holders are aligned to insure that lenses are properly positioned on top of respective sensors. This implementation could be more compact and allows having consistent and precise positioning of lenses and sensors. In the third example implementation, which is a wafer based solution; multiple multiresolution camera clusters are formed by using set of different resolution lenses that are disposed substantially on top of a single wafer including a camera sensor. Overall system can consist of one or several wafer based multiple multiresolution camera clusters. Specific patterns of multiple multiresolution camera clusters and their relative positioning for the first, second and third cluster implementations are also part of this disclosure. Embodiments of the present disclosure provide an embedded mobile computing device. The embedded mobile computing device includes multiple multiresolution camera clusters, a processor and memory. The memory includes a 3D image generation module, wherein the 3D image generation module is configured to generate depth maps and associated 3D images using the multiple multiresolution camera clusters.

Further, embodiments of the present disclosure provide methods of integration of the camera clusters based camera solutions as an integrated part of the current mobile devices, such as cell phones, tablets and/or laptops using resources of such devices, such as the "Image Sensor Processors" (ISP), General Processors, "Graphic Processing Unit" (GPU) and memory or they can be organized as separate units. Such separate units could be used as part of camera security systems, and/or they can be attached to cell phones, computers, TV, and so on using USB, wirelessly, and/or other such connectivity options.

Furthermore, embodiment of this present disclosure provides techniques to organize the use of separate camera clusters modules in combination with digital single lens reflex (DSLR) cameras and high end digital still cameras (DSCs). In one embodiment, this could be accomplished by attaching camera clusters to DSLR using DSLR flash interface to allow DSLR camera and camera cluster/module to take simultaneous shots of the images using flush interface as a synchronization mechanism.

BRIEF DESCRIPTION OF THE DRAWINGS

FIG. 3 is a block diagram illustrating another example three resolution camera cluster using radial pattern of camera positioning on a rectangular grid, according to an example embodiment;

FIGS. 4A to 4C are block diagrams of example two and three resolution multiple multiresolution camera clusters formed by lenses disposed directly on top of an image sensor chip/wafer, accordingly to an example embodiment;

DETAILED DESCRIPTION

Figure 1:
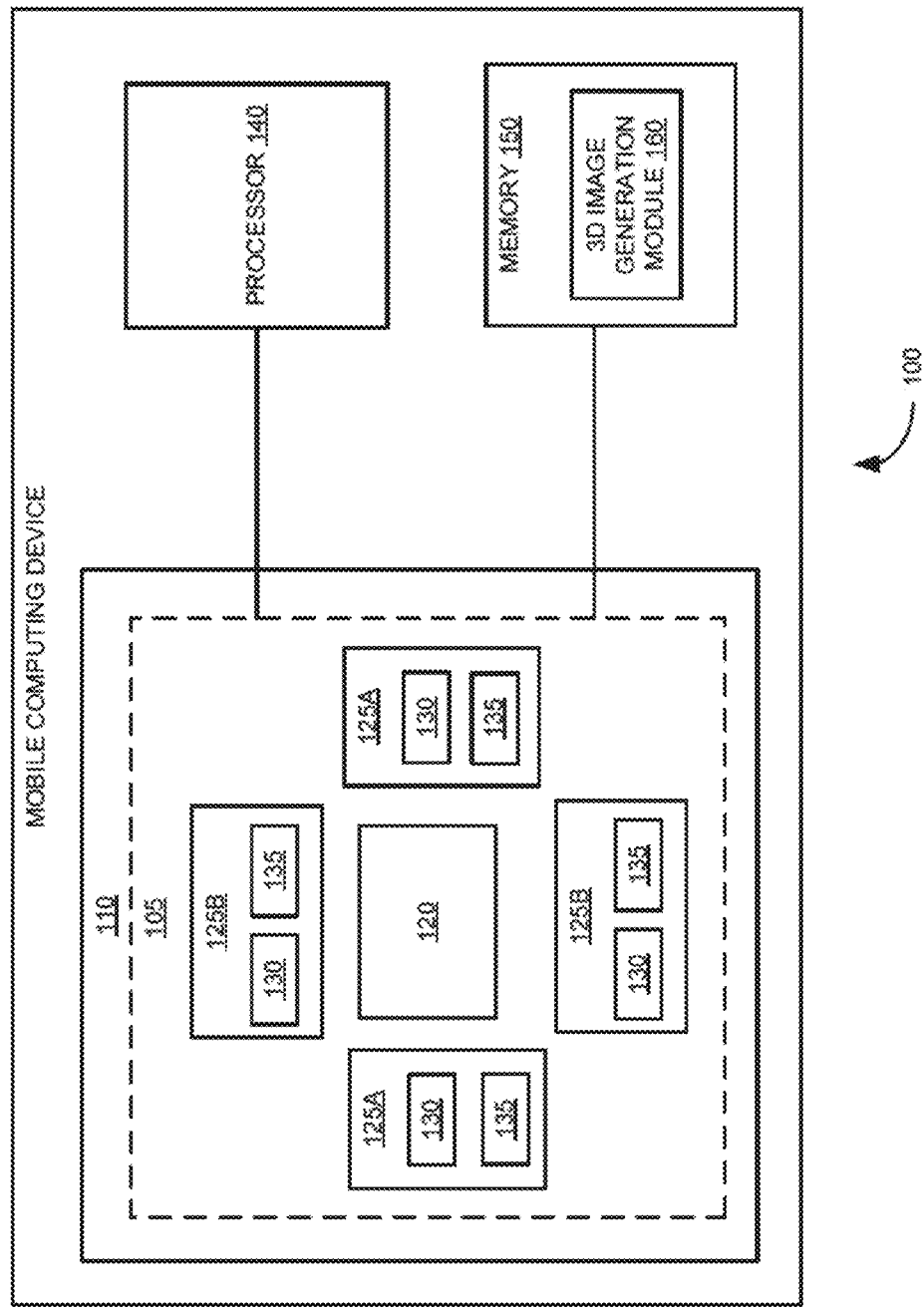
FIG. 1 is a block diagram illustrating system for generating depth maps and associated three-dimensional (3D) images using multiple multiresolution camera clusters, according to an example embodiment.

Embodiments described herein provide a technique for generating high-resolution depth map based on cluster hierarchy and multiple multiresolution camera clusters. The technique minimizes hardware and processing costs associated with generating depth maps and associated 3D images using camera array including different size cameras, such as a single or dual high-resolution cameras (big camera) surrounded by multiple lower resolution cameras (smaller cameras). The physical implementation of this technique may be accomplished in three ways. The first being, a cluster of individual cameras modules, in which each camera module consists of a combination of lenses and an image sensor. The second being, a two holder solution, where individual camera modules consisting of lenses and sensors are disassembled and placed in two separate specially machined holders: one for all lenses and one for all sensors. Then these holders are aligned to insure that lenses are properly positioned on top of the respective sensors. This implementation could be more compact and may allow having consistent and precise positioning of lenses and sensors. The third being, a "monolithic wafer solution" where multiple multiresolution cluster of lenses is placed on the top of a single large wafer and each lens from the cluster may be projected on its own part of the wafer. Also, the technique may be configured for use in multiple application domains, as integrated solution in mobile computing devices, such as point-and-shoot cameras, laptops, tablets and mobile phones; in security cameras; as separate camera cluster modules/devices are connected to DSLR and DSC cameras using camera flash interface or wireless connections; as separate camera cluster modules devices connected desktop computers, televisions (TVs) or game boxes either wirelessly or using, universal serial bus (USB) or high-definition multimedia interface (HDMI).

The use of multiple multiresolution clusters technique may optimize generation of depth maps and occlusion determination. Furthermore, the technique provides 3D imaging platform for multitude of 3D imaging techniques and applications. In addition, the technique uses combination of RGB Bayer pattern cameras and Clear Color Cameras, where all pixels do not have color (clear) Bayer cameras could leverage existing "image sensor processing" (ISP) hardware. In addition, the replacements of some lower resolution RGB cameras in multiple multiresolution camera clusters by clear color cameras provides the following advantages:

a. clear color cameras provide the intensity level for every pixel and have higher effective resolution compared to RGB cameras, which require de-mosaicking processing by ISP resulting in lower actual resolution compared to corresponding clear code cameras in clusters, which in-turn reduces both hardware costs and computations;

b. clear color cameras can be used directly in depth map generation without initial color processing by ISP, which substantially reduces computations; and c. clear color cameras deliver more light to the sensor's pixels than corresponding RGB cameras, which increases image quality in low light conditions.

Figure 13:
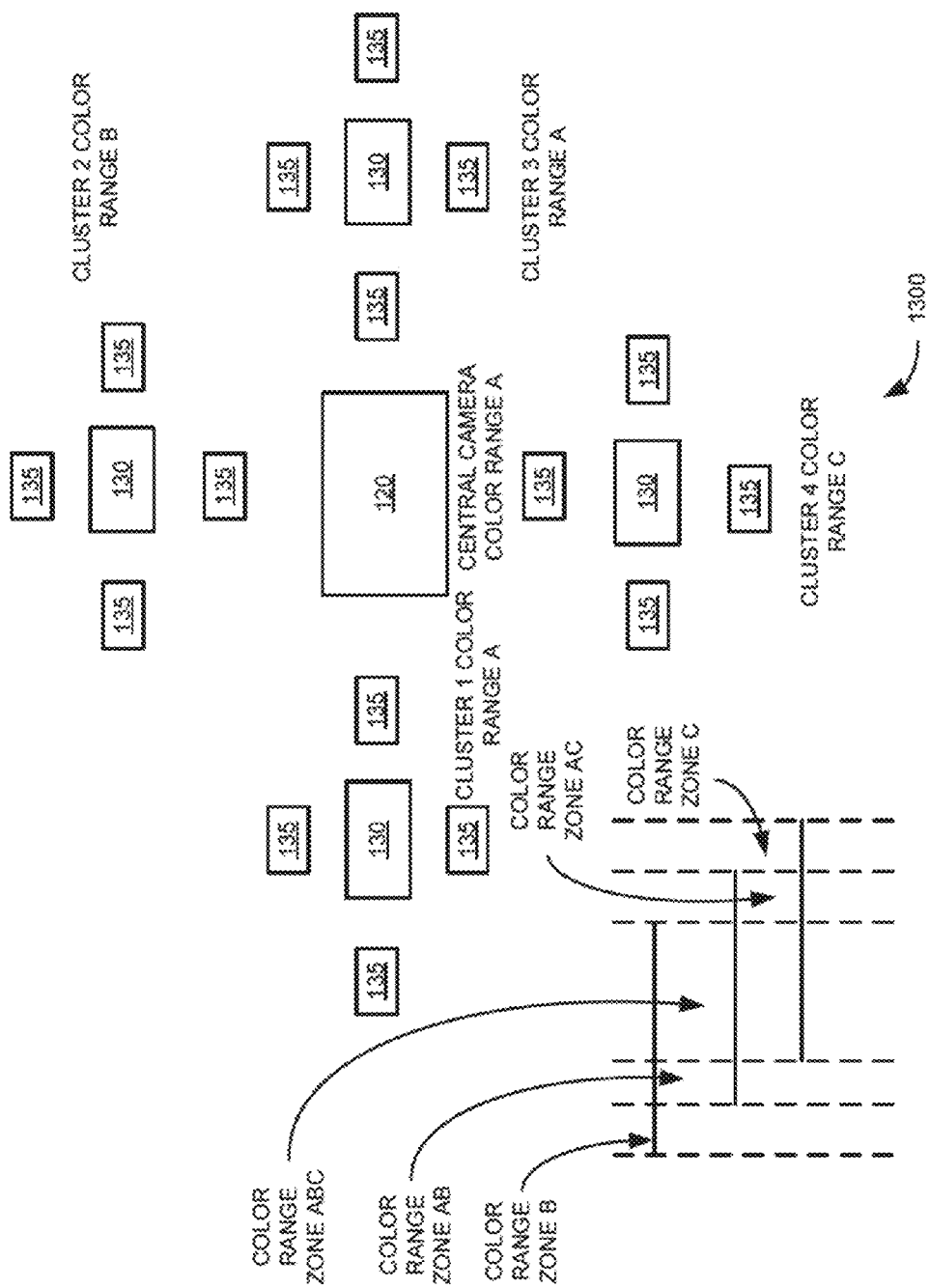
FIG. 13 is a block diagram illustrating application HDR parallax color range (intensity) selection using different exposures for each cluster in the multiple multiresolution camera clusters to generated depth map using the pipe line technique, such as those shown in FIGS. 6 and 8, according to an example embodiment.

Moreover, the "monolithic wafer solution" of multiple multiresolution clusters technique uses optical lens clusters on top of monolithic sensor to greatly reduce size, power consumption, bus bandwidth and manufacturing costs to provide a compact 3D imaging solution targeted to mobile computing devices, such as cell phones and tablets. The technique provides wafer based camera cluster patterns and innovative hierarchical techniques that are amicable to computational and power challenges for embedded computational photography applications. The technique further provides metadata for extending existing image formats for storing combined 3D and complimentary cluster information. The technique furthermore provides efficient 3D image generation using multiple multiresolution camera clusters that is amicable to many applications, such as capturing 3D scenes using mobile devices, 3D printing, automotive and security related applications and the like. The proposed solution substantially reduces computation complexity of depth map generation by computing low X, Y and Z resolution depth maps and then hierarchically increasing the resolution of the depth maps in each of the X, Y and Z directions. This proposed approach can significantly reduce computational complexity by up to a factor of logarithmic 2. Further, the proposed solution uses multiple camera clusters and cluster hierarchy approach to generate depth maps and images using multiple viewpoints for each cluster in order to improve handling of occlusions and to get better definition of edges. Furthermore, the proposed solution uses multiple camera clusters with different exposure times for generation of high dynamic range (HDR) images for use with overexposed and underexposed areas in the generated depth maps, as shown in FIG. 13. In some embodiments, the HDR images are generated using different exposures for different clusters in the cluster set. In addition, clusters with independent per camera cluster exposure times can have their own depth maps and these depth maps may be used in overexposed and underexposed areas. In addition, the proposed solution uses specific multiresolution refinements of depth map within the clusters and use the cluster hierarchy method for all the clusters.

Specific cluster patterns implemented using this method provide the foundation of efficient implementation for different applications. They reflect the balance between the overall cost of software and hardware and the resulting quality of depth maps and output image. Some applications are limited by the costs while others require higher depth map resolution and image quality. The cost of cluster implementation using cluster of individual camera modules depends on number of cameras used in the cluster. The higher resolution camera modules cost more than lower resolution modules. The cost of monolithic wafer solution depends on the overall size of the wafer and percentage of silicon utilization (pixel areas which actually receive lights through lenses) depends on size and specific position of lenses relative to each other. One skilled in the art can envision that the depth map resolution and image quality increases with increased number of cameras in cluster and their resolutions The use of independent camera cluster module with DSLR and high end DSC cameras require high quality and high-resolution depth maps. Again, one skilled in the art can envision that that the camera cluster module is disposed substantially close to the DSLR or DSC camera but is not obscured by its lenses. The camera cluster and the DSLR require making shots at the same time. Replacing DSLR flash with camera cluster module and attaching it to the flash connector allows using existing flash interface. DSLR flashes are n designed not to be obscured by the DSLR lenses and if camera cluster is physically positioned at the same distance from the DSLR camera as the flash module. DSLR lenses do not obscure the view of the camera cluster module. One or more camera cluster modules could also be connected to DSLR or DSC camera wirelessly and be controlled by DSLR using the same interface as flush.

System Overview and Examples of Operation

Figure 2:
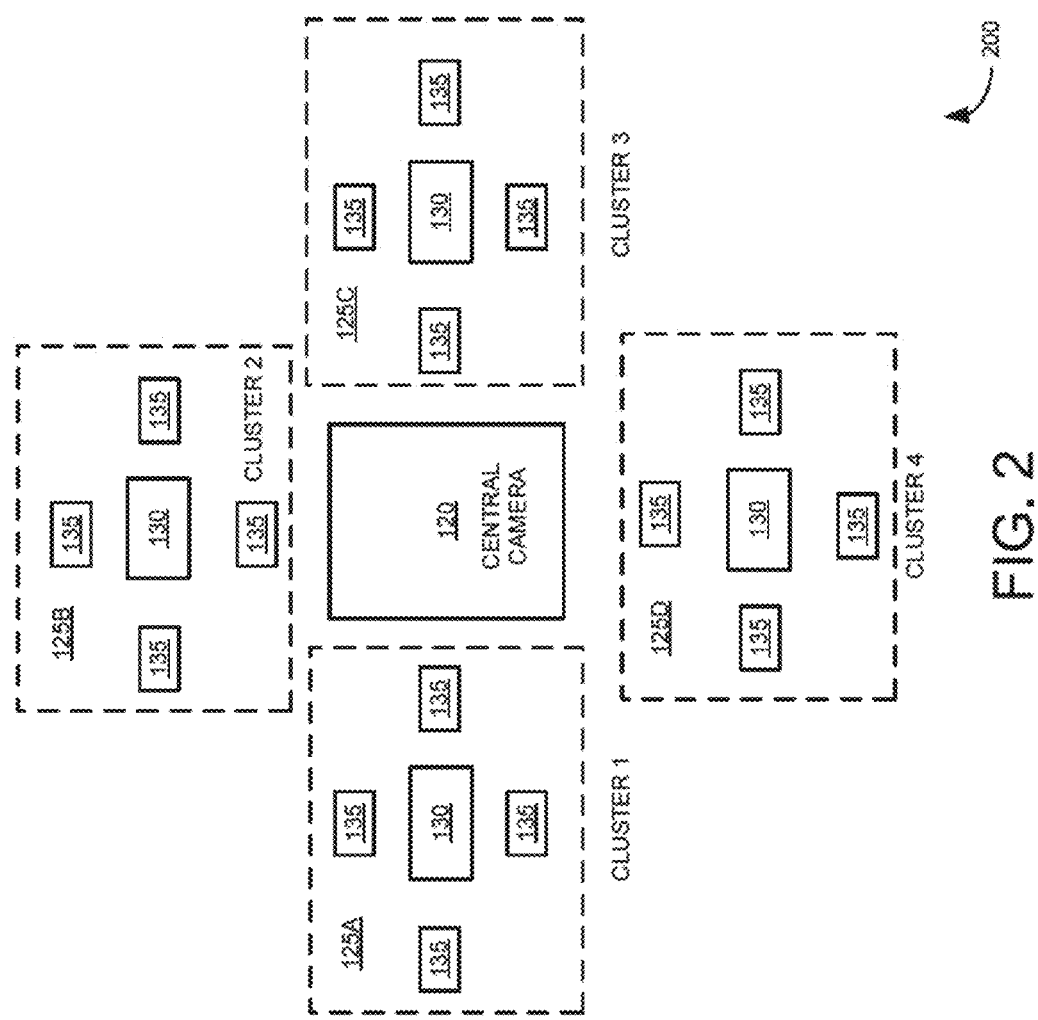
FIG. 2 is a block diagram illustrating an example three resolution camera cluster having four radially positioned camera clusters around a central camera, according to an example embodiment.

FIG. 1 is a block diagram illustrating system 100 for generating depth maps and associated 3D images using multiple multiresolution camera clusters 105, according to an example embodiment. As shown in FIG. 1, a mobile computing device 100 may include multiple multiresolution camera clusters 105, a processor 140 and memory 150 that are communicatively coupled with each other. Further as shown in FIG. 1, the multiple multiresolution camera clusters 105 includes a central camera 120 having a high-resolution, and remaining cameras 130 and 135 (in clusters 125A-D) having one or more resolutions that are lower than the central camera resolution (mid and low-resolutions) and disposed substantially around the central camera 120. In the example embodiment shown in FIG. 1, the central camera 120 and the remaining cameras 130 and 135 are formed using lenses that are disposed substantially directly on an image sensor 110 formed using a semiconductor wafer chip. In addition, as shown in FIG. 1, a 3D image generation module 160 resides in the memory 150. Example multiple multiresolution camera clusters 105 including multiple multiresolution cameras are illustrated in FIGS. 2 through 4. In some embodiments, the multiresolution camera clusters may have different configurations and different distributions of cameras between clusters.

Figure 14:
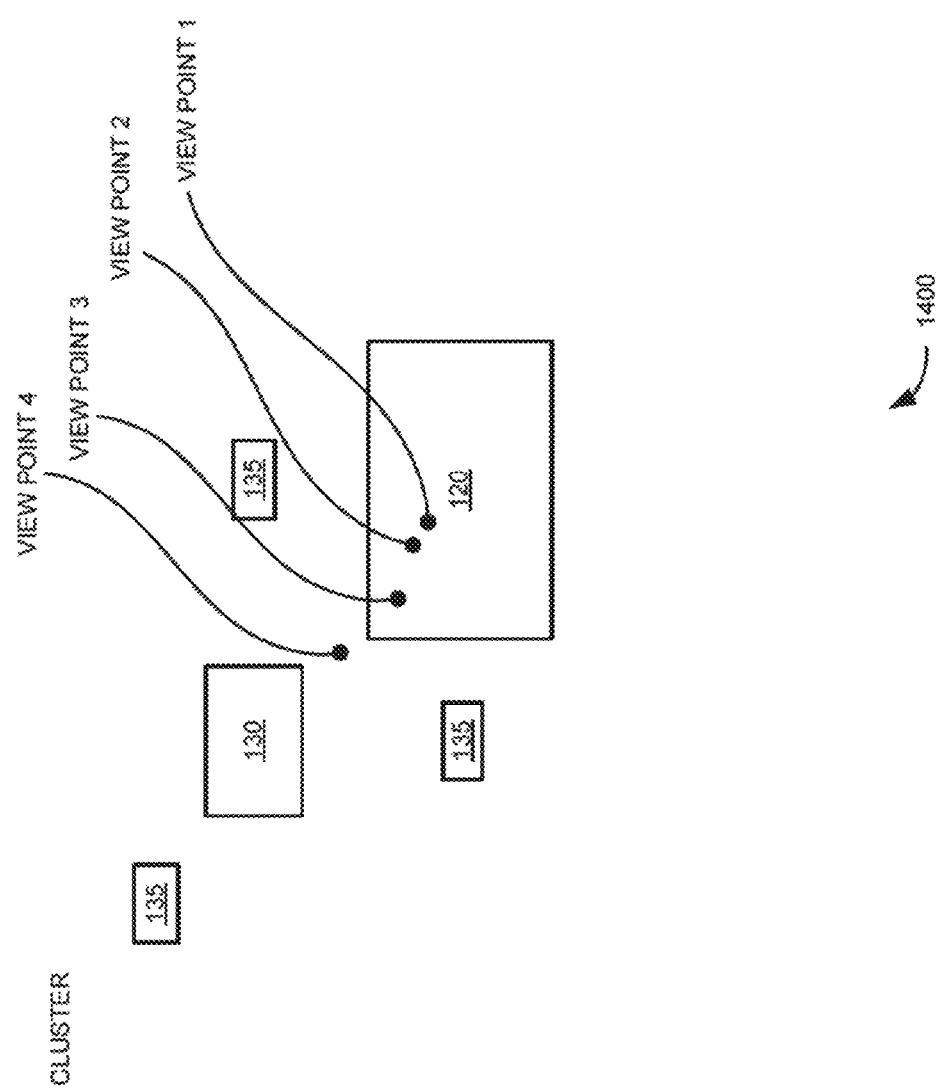
FIG. 14 is a block diagram illustrating an example three resolution camera clusters with selected four viewpoints used for depth map generation.

In operation, the 3D image generation module 160 captures images using the multiple multiresolution camera clusters 105. The 3D image generation module 160 then down scales the high-resolution image captured by the central camera 120 to be substantially equal to low-resolution images captured by the remaining cameras 130 and 135. The down-scaling process is shown in more detail in FIG. 6. In some embodiments, 3D generation module 160 then generates multiple low-resolution depth maps for each cluster 125A-D using multiple viewpoints of the central camera 120 (shown in FIG. 14) and the down-scaled images of the central camera 120 and the captured low-resolution images associated with the remaining cameras 130 and 135 using relatively smaller depths. As shown in FIG. 14, viewpoint 1 is a position at the center of the central camera 120. Other viewpoints 2-4 shown in FIG. 14 are positioned along the Epipolar line. The 3D generation module 160 then refines the generated low-resolution depth maps. The process of refinement is shown in more detail in FIGS. 10-12. Further, the 3D generation module 160 generates low-resolution central camera depth using the refined multiple low-resolution depth maps. The 3D generation module 160 then up-scales the low-resolution images to be substantially equal to the mid-resolution. The 3D generation module 160 then generates multiple mid-resolution depth maps for each cluster using the multiple viewpoints 1-4 shown in FIG. 14 and the up-scaled mid-resolution images. The 3D generation module 160 then generates an initial mid-resolution depth map using the generated multiple mid-resolution depth maps and the down-scaled central image. The 3D generation module 160 then iteratively refines (shown in FIGS. 10-12) the generated initial mid-resolution depth map. The 3D generation module 160 then up-scales central cluster images to high-resolution images. The 3D generation module 160 then refines iteratively a high-resolution depth map using the refined initial mid-resolution depth map, the low-resolution central camera depth map, and the up-scaled central cluster images (shown in FIGS. 10-12). The 3D generation module 160 then generates a final high-resolution depth map using the iteratively refined high-resolution depth map. The 3D generation module 160 then generates a 3D image from the captured images using the generated final high-resolution depth map. In some embodiments, the 3D image generation module 160 generates depth maps and 3D images using multiple camera clusters, cluster hierarchy, and multiple viewpoints per cluster to improve occlusion handling and to get better definition of edges, as shown in FIG. 14.

In some embodiments, the first resolution of the central camera 120 is a higher resolution (high-resolution) than the cameras 130 and 135 in the clusters 130-135. The remaining cameras 130 and 135 have one or more resolutions (mid and low-resolutions) that are different from the first resolution and are lower in resolution than the higher resolution of the central camera 120 as shown in FIGS. 2 to 4. Further in these embodiments, the central camera 130 of each camera cluster 125A-D has a higher resolution (mid-resolution) than the resolutions of the remaining cameras 135 in the camera clusters 125A-D as shown in FIGS. 2 to 8. In some embodiments, the remaining cameras 130 and 135 are substantially-radially positioned around the central camera 120 as shown in FIGS. 2, 3, and 4. Also in some embodiments, the central camera 120 and the remaining cameras 130 and 135 are formed by directly disposing the camera lenses on a semiconductor wafer chip as shown in FIGS. 4A, 4B, and 4C.

Figure 15:
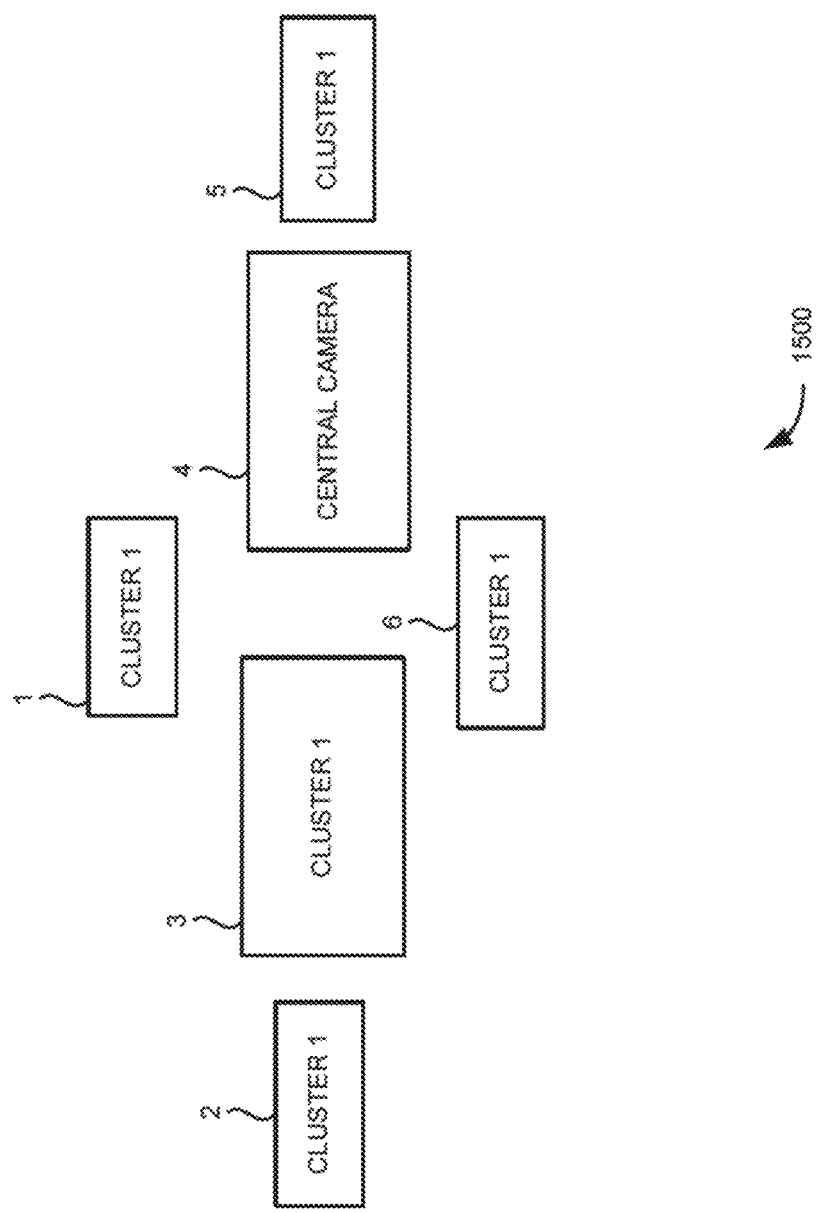
FIG. 15 is a block diagram illustrating an example two resolution camera clusters disposed around a central camera to produce 2× speed video, according to an example embodiment.
Figure 16:
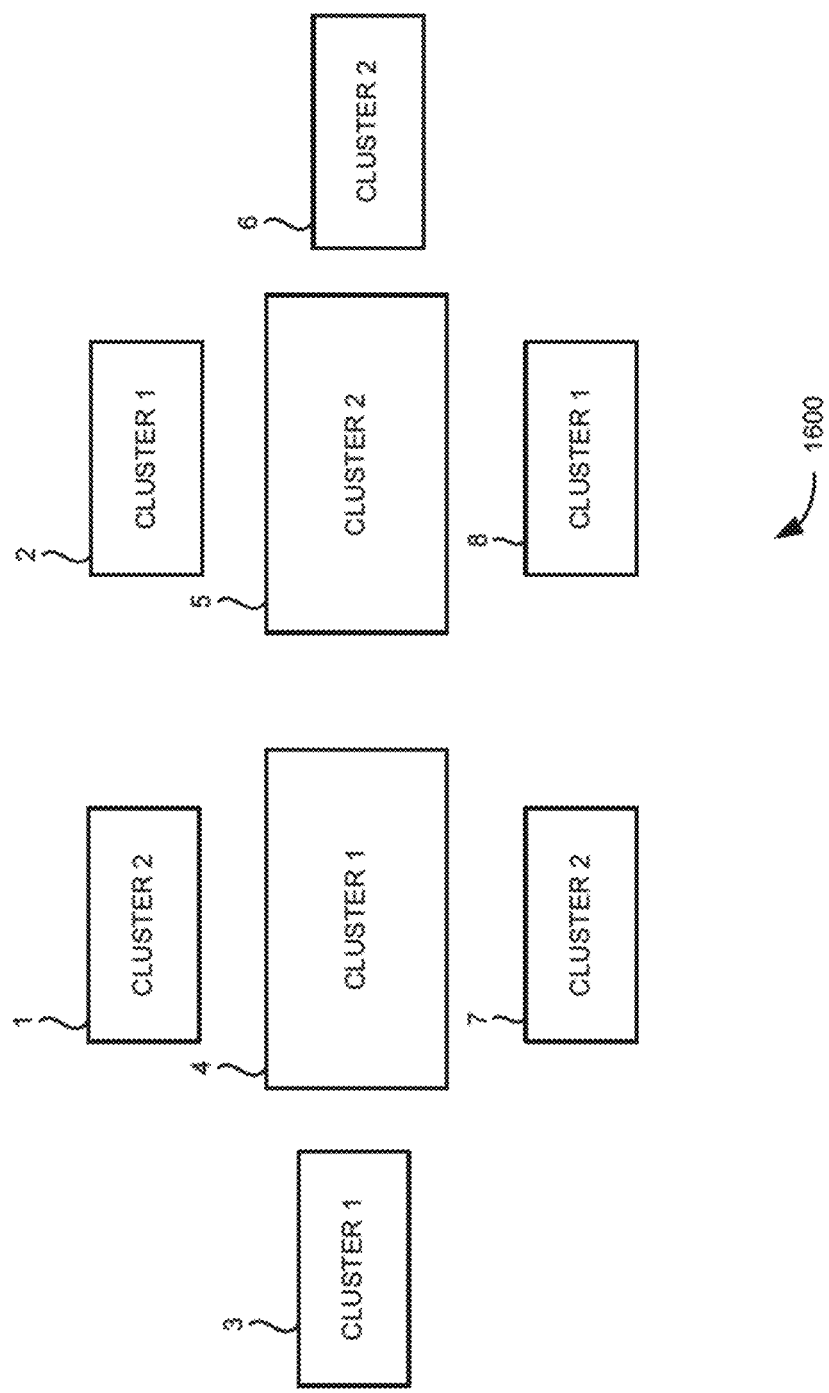
FIG. 16 is a block diagram illustrating another example two resolution camera clusters to produce 2× speed video, according to an example embodiment.
Figure 17:
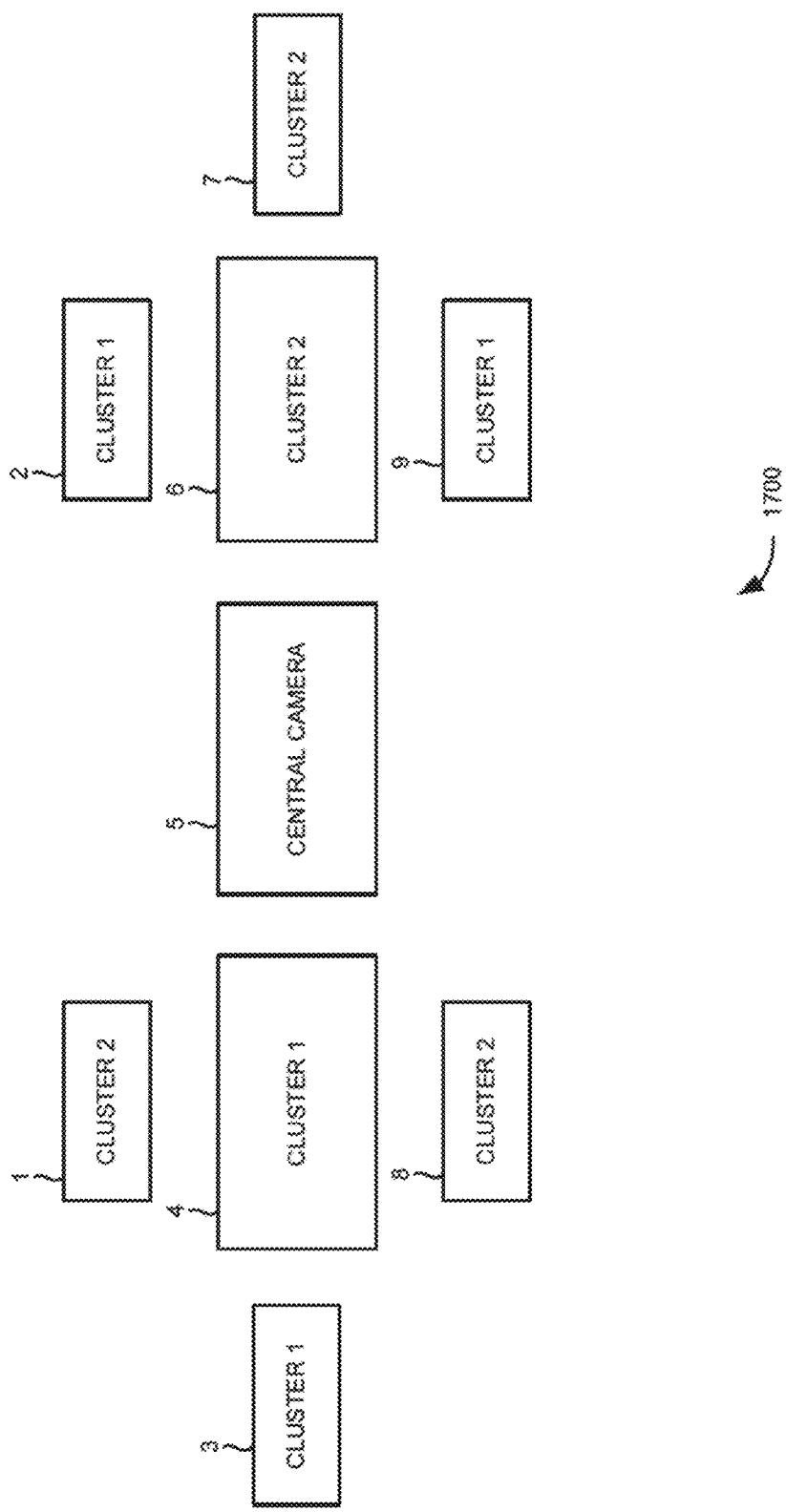
FIG. 17 is a block diagram illustrating another example two camera clusters and a central camera to produce 3× speed video.

FIGS. 2-4 illustrate radial pattern multiple multiresolution camera clusters including two resolution camera clusters which may be built using individual camera modules. FIG. 15 illustrate an example single resolution camera cluster disposed around a central camera to produce 2× speed video. FIG. 16 illustrate an example two resolution camera cluster to produce 2× speed video. FIG. 17 illustrates an example two resolution camera cluster and a central camera to produce 3× speed video. FIGS. 4A, 4B, and 4C illustrate monolithic wafer implementation of multiple multiresolution camera clusters, which are formed by disposing nine, five and thirteen lenses (e.g., 120L, 130L, and 135L) of corresponding cameras (e.g., 120, 130 and 135), respectively on wafer based image sensor. In these embodiments, the disposed lenses 120L, 130L, and 135L do not overlap with each other. In these embodiments, the circles around the lenses represent the sensor area used by lenses. For example, five lens solution shown in FIG. 4B allows to have larger individual sensor area which represent larger output resolutions, while the thirteen camera solution shown in FIG. 4C provides a better silicon utilization and can result in a better depth map quality. The nine camera solution of FIG. 4A shows an intermediate embodiment of the embodiments shown in FIGS. 4B and 4C for completeness. The smallest cameras shown in the nine and thirteen camera solutions (FIGS. 4A and 4C) can be of clear color.

In some embodiments, the central camera 120 and the remaining cameras 130 and 135 are disposed in a mobile computing device. Example mobile computing device are a smart phone, a tablet, a portable digital camera, a personal computer and the like.

Also, although certain terms are used primarily herein, other terms could be used interchangeably to yield equivalent embodiments and examples. For example, it is well-known that equivalent terms in the field of mobile computing system or similar or related fields could be substituted for such terms as "mobile computing device," "mobile device," or the like.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 5:
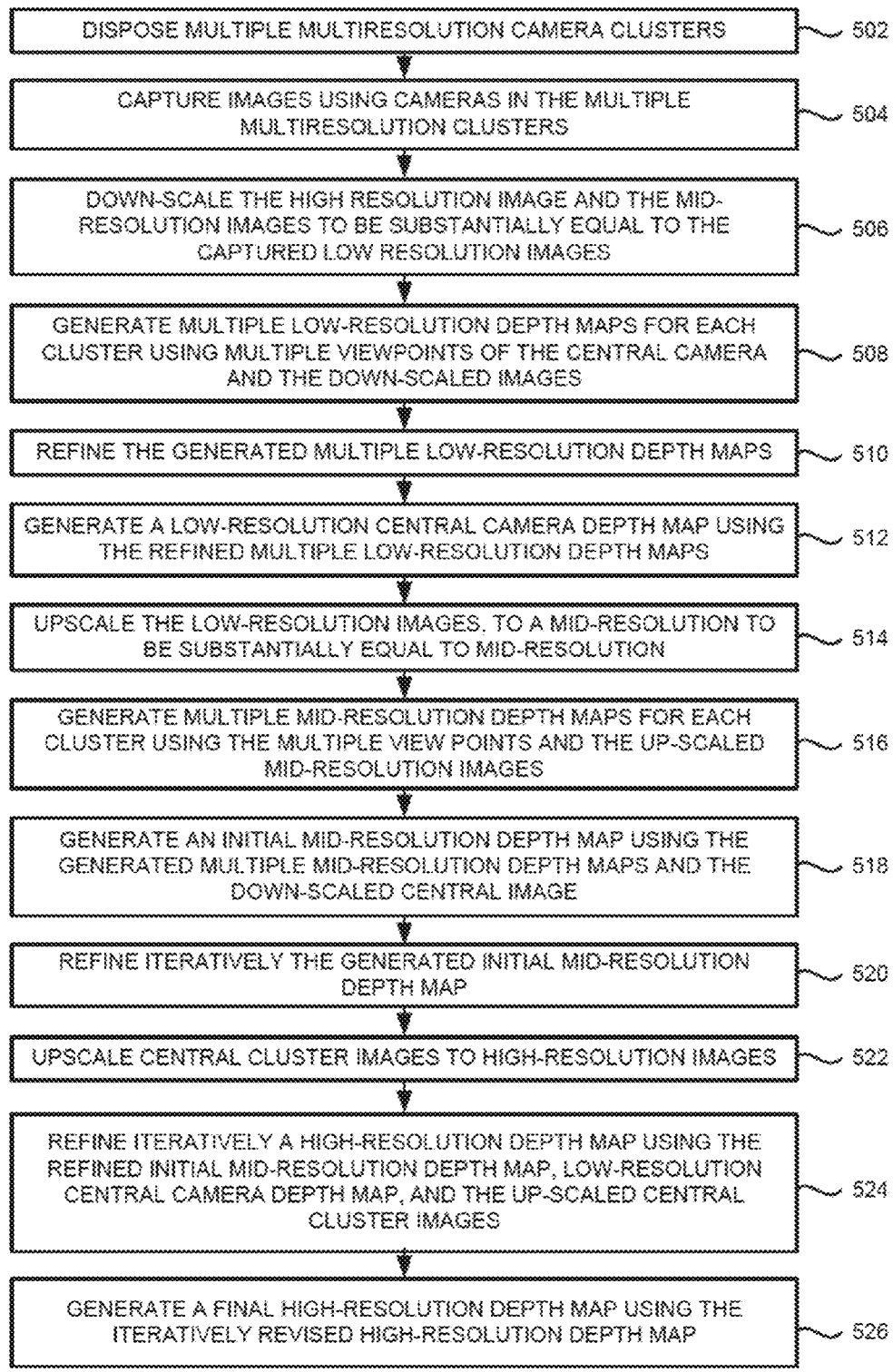
FIG. 5 is a flow diagram of a process for depth map generation based on cluster hierarchy and multiple multi resolution camera dusters, according to an example embodiment.

FIG. 5 is a flow diagram of process 500, for generating depth maps and associated 3D images using cluster hierarchy and multiple multiresolution camera clusters, according to an example embodiment.

At block 502, process 500, disposes multiple multiresolution camera clusters including a central camera having a first resolution (i.e., high-resolution), and remaining cameras having one or more resolutions (i.e., mid and low-resolutions) that are different from the first resolution, that are positioned substantially surrounding the central camera as shown in FIGS. 2-4. At block 504, images are captured using the disposed central camera and the remaining cameras in the multiple multiresolution clusters. In these embodiments, the central camera having the first resolution (i.e., high-resolution) has a higher resolution than the remaining cameras in the multiple multiresolution camera clusters (i.e., mid and low-resolutions). Also in these embodiments, the remaining cameras having the plurality of resolutions that are different from the first resolution (high resolution). Example remaining cameras may have the plurality of resolutions that are lower in resolution than the central camera having the higher resolution. Further in some embodiments, the central camera (e.g., 130) of each camera cluster (e.g., 125A-D) has a higher resolution (i.e., mid-resolution) than the resolutions (i.e., low-resolutions) of the remaining cameras (e.g., 135) in the camera cluster (e.g., 125A-D). Furthermore, in some embodiments, the remaining cameras (e.g., 130 and 135) are substantially radially positioned around the central camera (e.g., 120), as shown in FIGS. 2-4. The wafer based embodiments, shown in FIGS. 4A to 4C, including the central camera and the remaining cameras are formed by directly disposing the camera lenses on a semiconductor wafer chip including an image sensor. In some embodiments, the central camera and the remaining cameras are configured to be disposed in a mobile computing device. Example mobile computing devices are a smart phone, a tablet, a portable digital camera, a personal computer, and the like.

Figure 6:
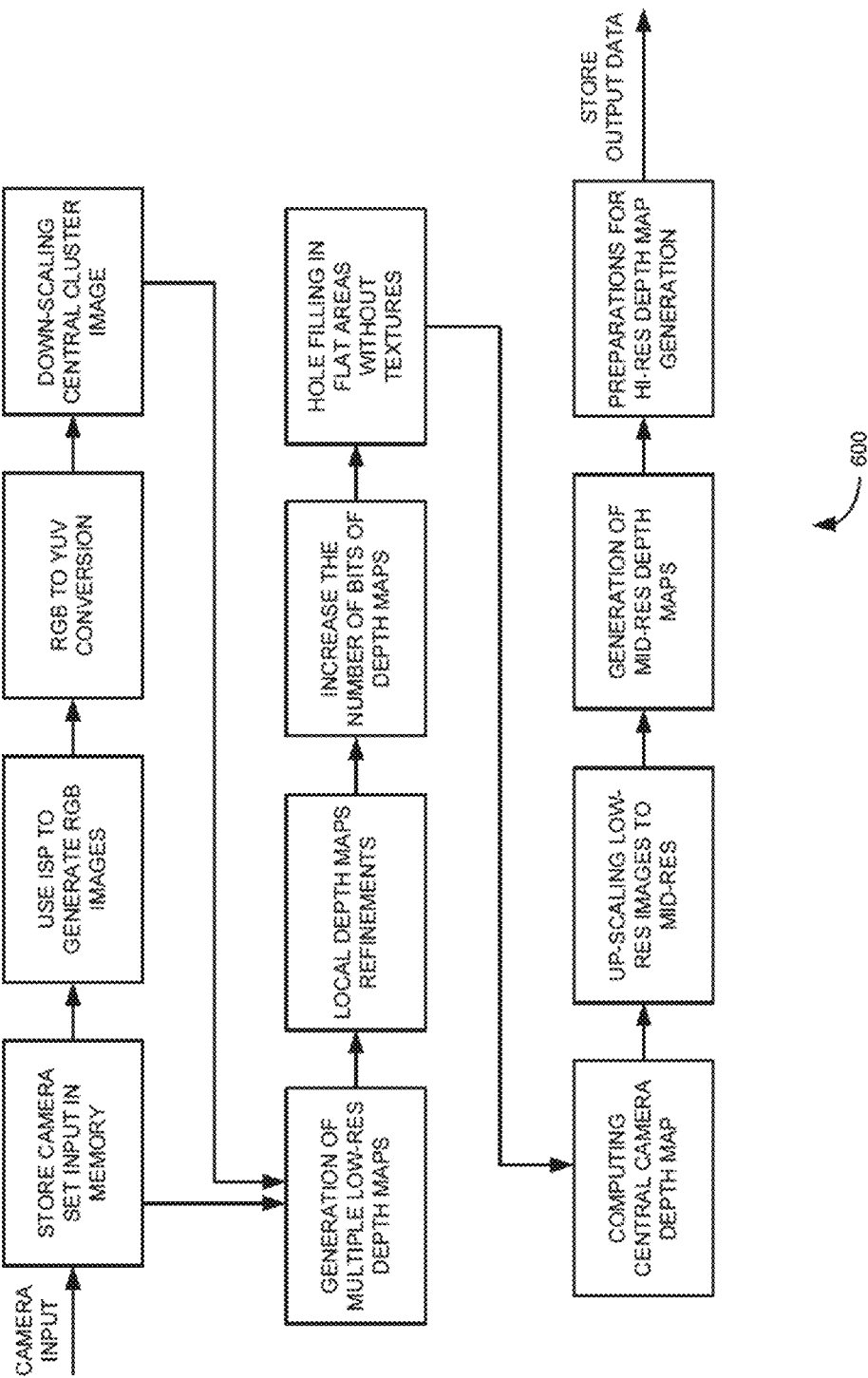
FIG. 6 is a pipe line flow diagram illustrating first stage of hierarchical high-resolution depth map generation, according to an example embodiment.
Figure 8:
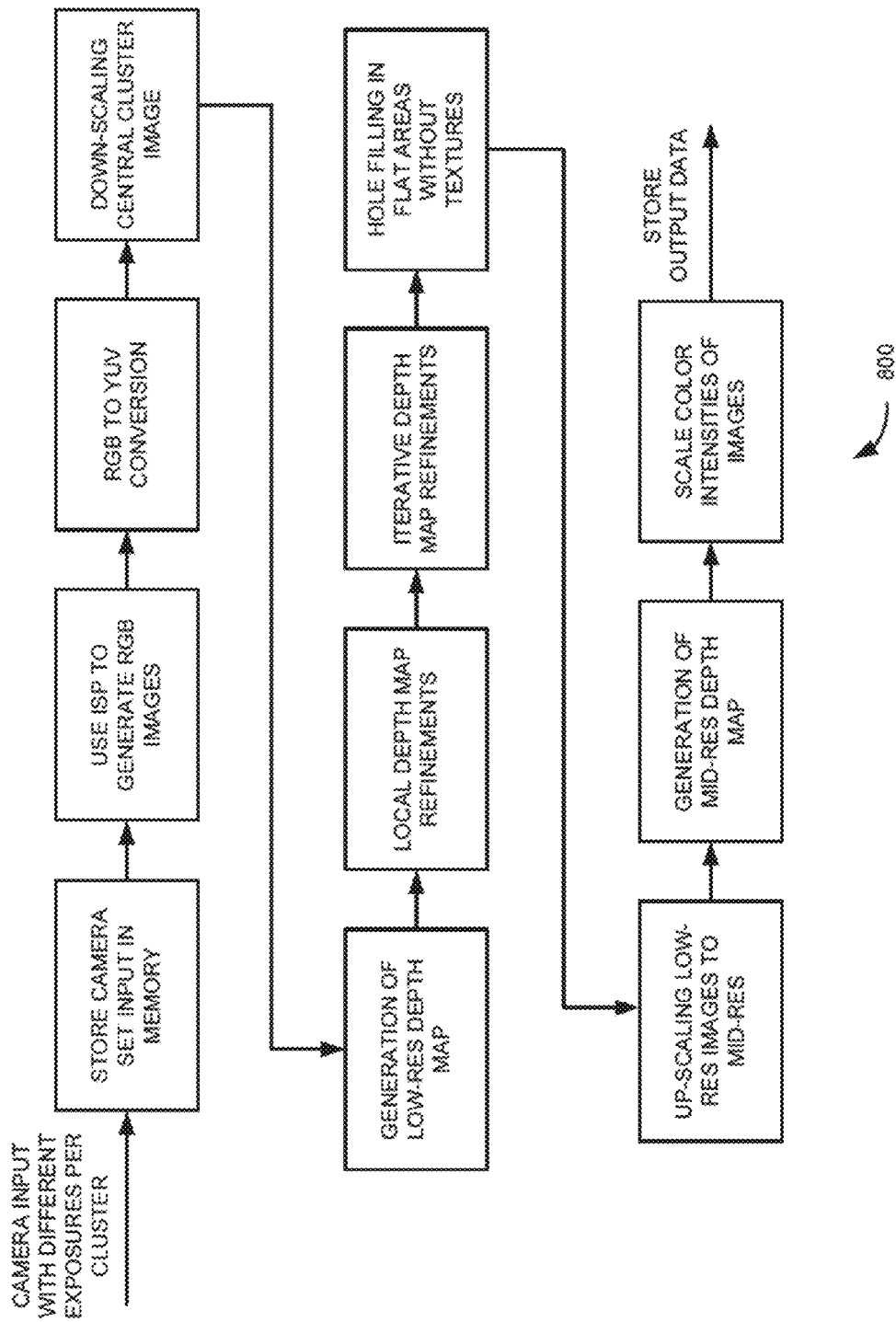
FIG. 8 is an example pipe line flow diagram illustrating first stage of hierarchical high-resolution depth map generation for high dynamic range (HDR)

At 504, images are captured using cameras in the multiple multiresolution clusters. Captured images may be stored in memory 150 (shown in FIG. 1). In some embodiments, for 3D high-resolution mode RGB images (in Bayer pattern) in the camera cluster are captured at substantially the same time and stored in main memory, typically, using "mobile industry processor interface" (MIPI) interface. (As shown in FIGS. 6 and 8). In case a camera cluster also has Clear Color (transparent) cameras, their input may also be captured at substantially the same time and stored in the main memory, typically, using MIPI interface as shown in FIG. 6. Since clear code cameras have only the intensity (Luma) their output will go directly to a next block as shown in FIG. 8. Then in order to minimize power consumption the initial stage of computation pipeline may utilize existing ISP to perform de-mosaicking and other operations required to generate RGB images for all Bayer pattern cameras. Images stored in memory are being sent to ISP one by one and the resulting RGB images will be sent back to store them in the memory as shown in FIGS. 6 and 8. The next step may convert images to YUV or YCrCb formats as shown in FIGS. 6 and 8, to use the Luma component Y as a source of depth computations in multi-camera parallax and having Chroma components playing complimentary role. It is also possible to generate YUV or YCrCb using dedicated hardware that may be already available on some of the devices as shown in FIGS. 6 and 8.

At block 506, the resolution of the captured image by the central camera and the mid-resolution images are downscaled to be substantially equal to the captured low-resolution images. All the high and mid-resolutions images are downscaled to low-resolution to match the lowest resolution of surrounding images. The downscaled images may be stored in memory 150 (shown in FIG. 1) for later computations. From computational point, it may be desirable to use low-resolution to be half the resolution of mid-resolution images and mid-resolution images to have half the resolution of high-resolution image. However, the technique may significantly reduce computations even when the ratios of low-need resolution and med-high-resolution are not one half. In some embodiments, the hierarchical approach includes computing low-resolution depth maps using captured images associated with remaining cameras (e.g., 135) having lower resolution in the camera cluster (e.g., 125A-D) using relatively small depths. The computed low-resolution depth maps are then refined. A high-resolution depth map is then computed using the captured images associated with the central camera (e.g., 120) and central cameras (e.g., 130) of each of the multiple camera clusters (e.g., 125A-D) and the refined computed low-resolution depth maps. The downscaling process is shown in more detail in the flowchart of FIG. 10.

In some embodiments, in order to minimize the amount of depth map computations at the initial stage of depth map generation by down scaling the high-resolution of depth map is being downscaled to low-resolution to match the resolution of surrounding images. Generally, it is desirable from computational point of view to have low-resolution images, i.e., about half of the resolution of a high-resolution image. The next stage is to use multi-view parallax techniques to compute depth map for every pixel visible by two or more cameras. This may be done by computing parallax shift for every depth using all cameras from which the particular pixel is visible and finding a best match. At this stage, pixels that are not seen by any of the cameras are determined and excluded from computations. The use of partial summations and computations along the Epipolar lines will further assist to reduce total amount of needed computations and to can make the final result much more accurate.

Figure 10:
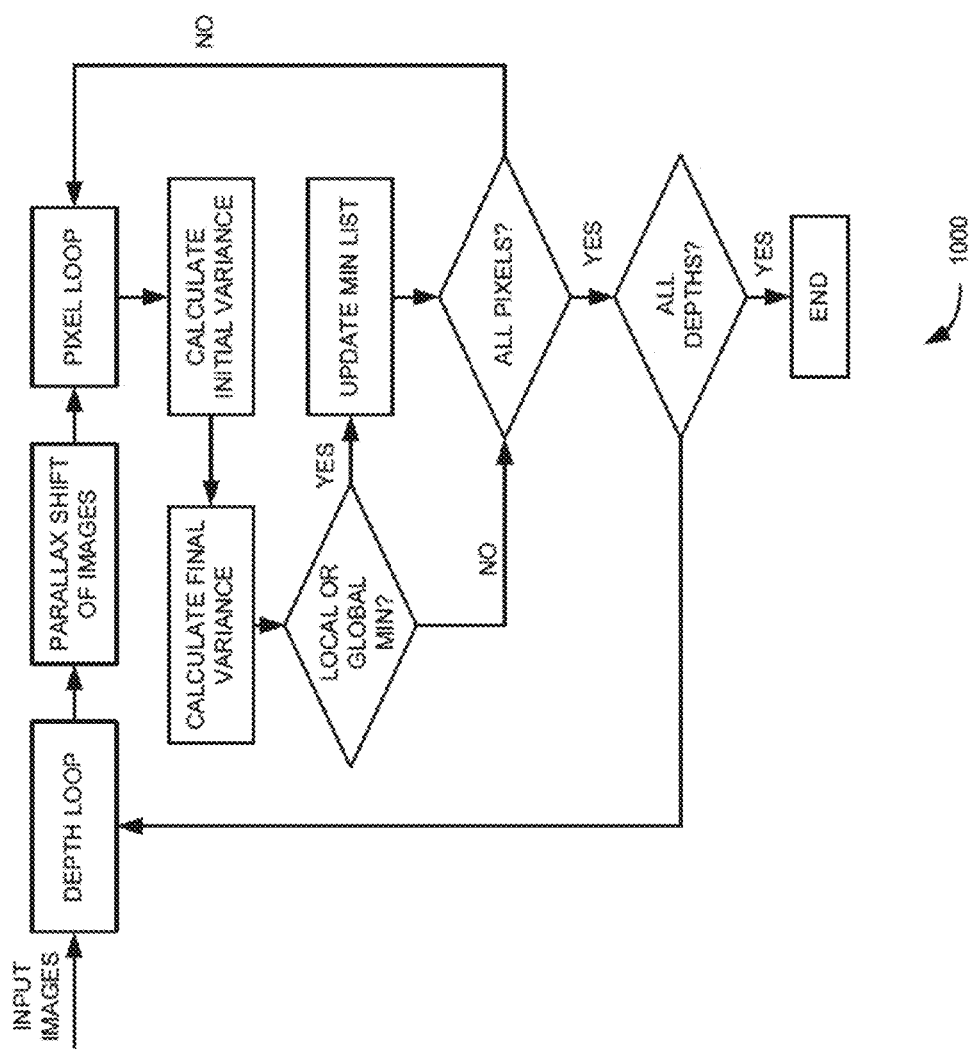
FIG. 10 is a flow diagram of process for initial low-resolution depth map, such as those shown in FIGS. 6 and 8, according to an example embodiment.
Figure 11:
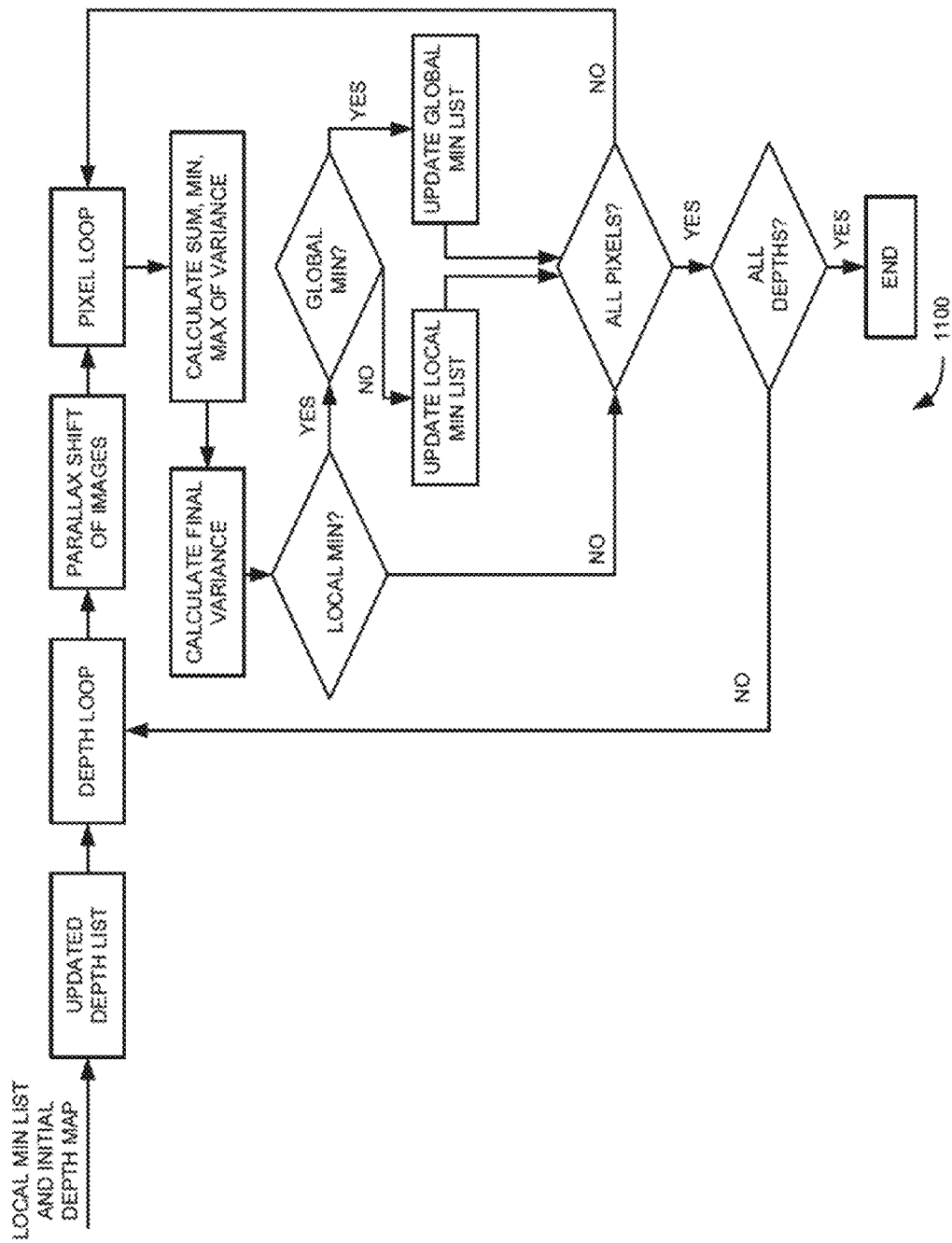
FIG. 11 is a flow diagram of process for depth map refinements, such as those in FIGS. 6 and 8, according to an example embodiment.
Figure 12:
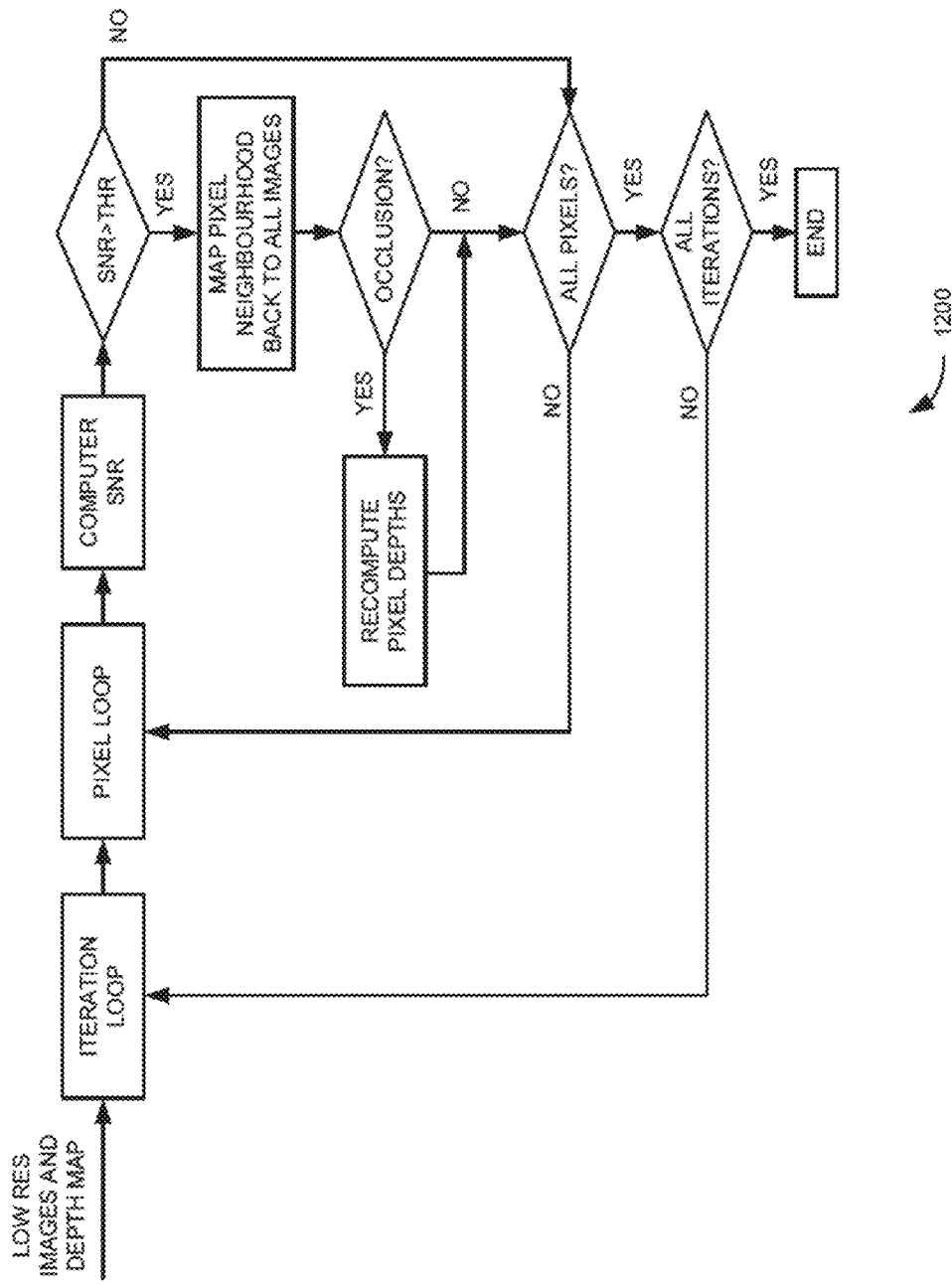
FIG. 12 is a flow diagram of process for iterative depth map refinements using infra-red active texturing, such as those shown in FIGS. 6 and 8, according to an example embodiment.

Furthermore, in some embodiments, the parallax shift for all pixels in all images are performed to match corresponding pixels in reference image, because parallax shift is proportional to inverse distance to the camera, and also for using inverse distances (disparities) in the depth map computations. Parallax shift may also depend on distance between cameras and it can be constant for a given camera at a given depth. FIGS. 10-12 illustrate initial depth generation. Also, because at this stage of computation actual depth is not known and this operation is performed for all depths in the initial depth set as shown in FIGS. 6 and 8. Based on a given depth, parallax shift of all image is performed to generate the shifted images as shown in FIGS. 6 and 8. The next step in the computation is to find a best match for every pixel in reference image in the neighborhoods for all images in order to find the best matching pattern. Typically, neighborhoods could be made of 3×3 or 5×5 pixels. Actual pattern matching may be done by computing the sum of variances between corresponding pixels of reference image and other images. Further in these computations, minimum and maximum deltas between reference and other pixels in the neighborhood are determined as shown in FIGS. 6 and 8. Then for each pixel, minimum and maximum deltas are discarded and the final "Variance" is recomputed as shown in FIGS. 6 and 8. All pixels' depths for two previous depth levels are stored and minimum list is maintained for each pixel which contains global and local minimum variances. Variance of current depth is checked for global minimum and variance of previous depth for local as shown in FIGS. 6 and 8. Depth with global minimum value is used as a pixel depth for the depth map. Depths from local minimum list are used as input in depth map refinements technique as shown in FIGS. 6 and 8. The above described process is repeated until all pixels are processed for all depths in initial depth set.

At block 508, multiple low-resolution depth maps are generated using the down-scaled captured image of the central camera and the captured images associated with the mid-resolution cameras in the multiple multiresolution camera clusters using multiple viewpoints per cluster.

In one example embodiment, multi-view parallax techniques are used to compute several depth maps for each cluster using multiple viewpoints per cluster. One of the viewpoints may be a viewpoint in the central camera as shown in FIG. 14. The remaining viewpoints may be selected as a slight shift from the central camera along the Epipolar lines as shown in FIG. 14. This may be done by computing parallax shift for each depth from initial depth set using all cameras from for each camera cluster an for each cluster's viewpoint to find which the particular pixel is visible and finding optimal matches per pixel. The initial depth set may have a small number of bits (for example, 6 or 7 bits). The number of bits in individual depth maps for each cluster for each viewpoint may be increased as shown in FIGS. 6 and 8. At this stage, cameras that do not see these pixels are excluded from computations for a given pixel. The use of partial summations and computations along the Epipolar lines within clusters may reduce total amount of computations needed to make the final result more accurate. In this example embodiment, all of the initial parallax computations are performed using intensity Y color component as shown in FIGS. 6 and 8.

In another example embodiment, parallax shift for all pixels in all images are performed to match corresponding pixels in reference image. Because parallax shift is proportional to inverse distance to the camera, inverse distances (disparities) are used in the depth map computations. Parallax shift may also depend on distance between cameras and may be constant for given camera at given depth. FIG. 10 illustrates initial depth generation. Initially actual depth may not be known and therefore, operation for all depths in the initial depth set are performed as shown in first block of FIG. 10. For a given depth, parallax shift of all image is performed and shifted images are generated as shown in second block of FIG. 10. Then for every pixel in reference image, a possible best match of this pixel in the neighborhoods are determined for all images in order to find the best matching pattern. Typically, the neighborhoods could be of size 3×3 or 5×5 pixels as shown in the third block of FIG. 10. Actual pattern matching may be done by computing a sum of variances between corresponding pixels of reference and other images. During these computations, Min and Max deltas between reference and other pixels in the neighborhood are determined as shown in the fifth block of FIG. 10. Then for each pixel Min and Max deltas are discarded and the final variance is recomputed as shown in sixth block of FIG. 10. All pixels' depths for two previous depth levels are stored and a Min list is maintained for each pixel, which contains global and local Min variances. Variance of current depth for global Min and variance of previous depth for local are checked as shown in sixth block of FIG. 10. Depth with global Min value is used as a pixel depth for the depth map. Depths from local depth Min list are used as input to depth map refinements technique. Min list is computed as shown in the seventh block of FIG. 10. The above described above process is repeated until all pixels for all depths in initial depth set are computed.

At block 510, the generated multiple low-resolution depth maps are refined. Multiple low-resolution depth maps may be refined using color (for example Chroma) information. For example, the intensity (Luma) for a given pixel may be same as for their neighboring pixels except of there may be a color edge or other color texture feature that may need to match the unique position of the pixel by several cameras. In one example embodiment, at this stage the above refinements of the global depth may not be sufficient because in some instances the refinements of the local minimum depths may produce actual global depths. This technique is shown in more detail in FIG. 11. Starting with local depth list and an updated depth list containing number of additional depths around local min depths are created. The technique described is then repeated for the updated depth list.

Further in this example embodiment, iterative depth map refinements may be performed at low-resolution. Iterative depth map refinement may be performed if there is single cluster implementation, otherwise this technique may be applied at high-resolution. The depth map refinements may be performed on the edges of neighborhoods. Signal to Noise Ratio (SNR) may be used to define these areas. Special attention may be used to "silhouette" edges i.e., the edges where there is a jump in depth between different sides of the edge. The presence of silhouette edges may be also an indication that there could be an occlusion zones for some cameras. This technique is shown in more detail in FIG. 16. The input to this technique may be low-resolution images, down-scaled central image and refined depth map. The depth map refinement may include for one or more iterations. Each iteration may include processing all pixels in the reference image. For each pixel in the reference image SNR is computed. The SNR block size may be 5×5 or 7×7. The camera calibration data, camera noise model and a pre-defined threshold may be used, which are specific for a particular vendor and vendor's model. SNR is then compared to threshold, and if SNR value for particular pixel is above the threshold then parallax warping of pixels in the neighborhood of reference image may be performed using current depth map to all other images and compute corresponding variances as shown in FIG. 10. If variance for one or more images is substantially higher then variance for other images, then it may be concluded that the images in this particular pixel is occluded and pixel's depth value is recomputed by excluding occluded pixels as shown in FIG. 10 and the depth value in the depth map stored. After refining all pixels, the above process is repeated in the next iteration using the updated depth map.

Because depth map for these areas may not be defined, where depths are defined, one of the extrapolation methods may be chosen for moving inward from the boundary of these areas. At this stage, one skilled in the art may use any number well known operations, such as a sliding window operation on computed depth map. The window may be of 3×3 or 5×5 pixels in size. This same process may be used to fill depths in occlusion areas. Extrapolation methods, such as methods active texturing for the clusters may be used as an alternative to hole filling, which may have infra-red cameras and overall system may have active light source for texturing.

In some embodiments, during generation of depth map, particular areas of the image having flat areas without textures and depth are determined for all pixels in such areas. This may be performed by computing a confidence map. The confidence map could have low value for two reasons, one being flat areas without texture and the other being occlusion zone. The occlusion zone in low confidence maps areas may be removed by using several separate clusters of cameras and when some of them have high confidence values the y may not be used in active light texturing. For the remaining areas, the commutation of depth maps may be performed by using infra-red cameras and further using the same depth map generation technique. The results of active light texturing are up-scaled and then all pixels in flat areas without textures are replaced by these values. Due to relatively low-resolution, depth map using active illumination could be computed for all pixels' parallel to regular depth map. Up-scaling and pixel replacements may be performed in flat areas.

At block 512, a low-resolution central camera depth map is generated using the refined multiple low-resolution depth maps. In some embodiments, the number of bits may be included in the generated low-resolution depth maps. For each pixel of each low-resolution depth map parallax to the neighboring depths may be computed by increasing number of bits and then use local refinements to select an optimum depth for the pixels, this technique may result in increased depth precision by two or three bits and may be performed more than once. This may result in increased depth precision in the order of 10 to 12 bits.

If there are any holes for the flat areas, which may have no texture and occluded pixels that are visible to only one camera in the multiresolution cluster, in the refined low-resolution depth maps, they may be filled using some extrapolation methods moving from the boundary of the hole to its interior. All pixels in these areas may be filled.

In some embodiments, refinements of generated low-resolution depth map from view point of central camera may be refined using all low-resolution depth maps associated with each cluster computed from multiple viewpoints. This technique may allow to improve quality of edges and may further reduce occlusion areas. Because some of the pixels in the central depth map may be visible from other clusters, depth map and corresponding depth values from other clusters may be used for refinements.

At block 514, the low-resolution captured images of the multiple multiresolution camera clusters are up-scaled to be substantially equal to the mid-resolution. In an example embodiment, known up-scaling methods may be used on the target system. Example known up-scaling methods are bilinear up-scaling, bicubic up-scaling, polyphase up-scaling, custom up-scaling and the like. The quality of final depth map may depend on the quality of chosen up-scaling method. In addition to up-scaling the low-resolution images, low-resolution depth map may also be up-scaled using the same up-scaling method.

Figure 7:
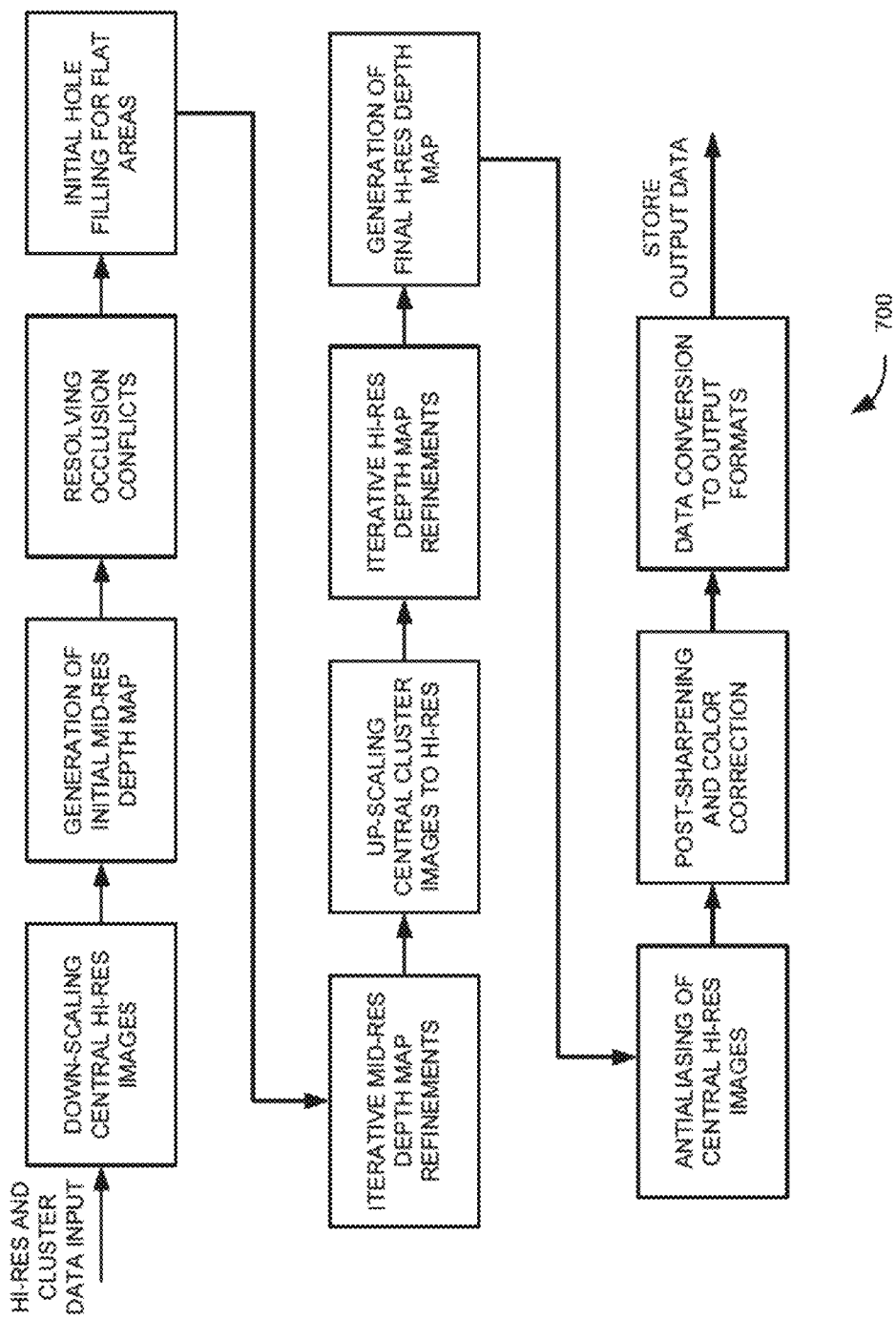
FIG. 7 is a pipe line flow diagram illustrating second stage of hierarchical high-resolution depth map generation, according to an example embodiment.
Figure 9:
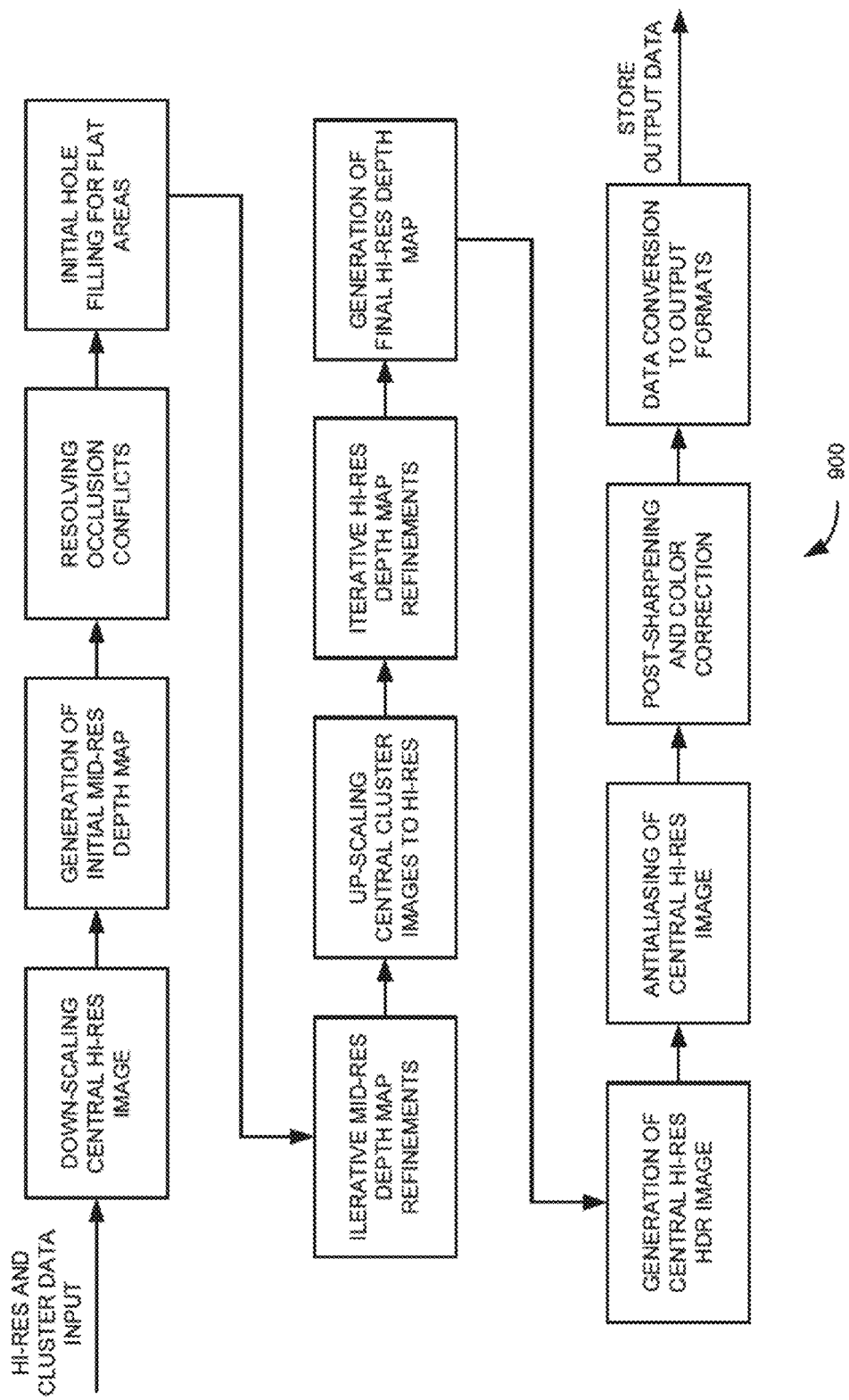
FIG. 9 is an example pipe line flow diagram illustrating second stage of hierarchical high-resolution depth map generation for HDR.

At block 516, multiple mid-resolution depth maps are generated for each cluster using the multiple viewpoints and the up-scaled mid-resolution images as shown in FIGS. 7 and 9. In some embodiments, the number of bits for mid-resolution depth maps may be increased using parallax techniques described above for low-resolution depth maps.

At block 518, an initial mid-resolution depth map may be generated using the generated multiple mid-resolution depth maps and the down-scaled central image to mid-resolution. At block 520, the generated initial mid-resolution depth map may be iteratively refined, i.e., hole filling for flat areas as described above with reference to low-resolution depth map generation.

At block 522, central cluster images are up-scaled to high-resolution images. At block 524, a high-resolution depth map is formed by iteratively refining the initial mid-resolution depth, map, the low-resolution central camera depth map, and the up-scaled central cluster images. At block 526, a higher resolution depth map is generated using the iteratively refined high-resolution depth map. The technique for generation of high-resolution depth map may use up-scaled low-resolution images and/or up-scaled low-resolution depth map. In these example embodiments, the technique for higher resolution depth map is essentially the same as the generation of low-resolution depth map and uses up-scaled low-resolution depth map, up-scaled low-resolution images and/or central high-resolution image as shown in FIGS. 10 and 11.

A 3D image of the captured images may then be generated using the generated high-resolution depth map and the captured images. In one example embodiment, the captured images are 2D captured images.

Figure 18:
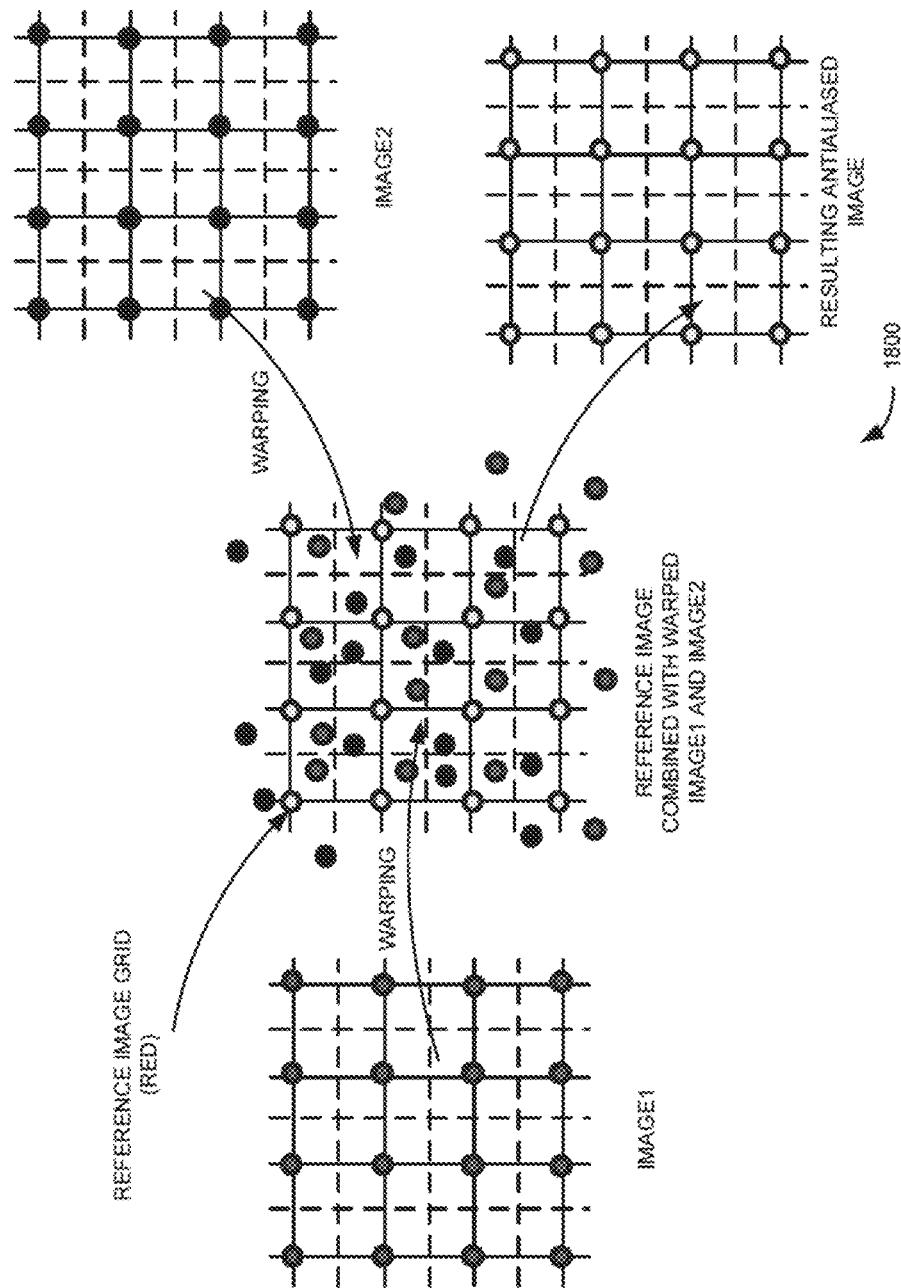
FIG. 18 is a schematic diagram illustrating antialiasing application to generated depth map using the pipe line technique, such as those shown in FIGS. 6 and 8, according to an example embodiment.

In some embodiments, using final depth map for warping all pixels (in all up-sampled images) into reference image using antialiasing process illustrated in FIG. 18. Complimentary structure to hold values of the pixels are created which are placed into area of particular reference pixel together with distance to pixel center. Then normalized weighted sum included reference pixel is computed for each pixel in the reference image. Reference pixel may have a much higher weight than warped pixels. The weight may be computed based on the distance from the center.

In some embodiments, post-sharpening methods, such as, bilateral filters may be used on the target system. Also in some embodiments, color correction methods, such as, tone curves may be used on the target system.

Further in some embodiments, during generation of depth map, particular areas of the image having flat areas without textures depth are determined for all pixels in such areas. This may be performed by computing a confidence map. The confidence map could have low value for two reasons, one being flat areas without texture and the other being occlusion zone. The occlusion zone in low confidence maps areas may be removed by using several separate clusters of cameras and when some of them have high confidence values then we do not use them in active light texturing. For the remaining areas the commutation of depth maps is performed by using infra-red cameras only the same using the same depth map generation technique. The results of active light texturing are up-scaled and then all pixels in flat areas without textures may be replaced by these values. Due to relatively low-resolution, depth map using active illumination could be computed for all pixels' parallel to the normal depth map. Up-scaling and pixel replacements may be performed in flat areas.

In some embodiments, the multiresolution camera cluster is disposed on a flash of a DSLR or a high end DSC and further configured to use flash interface to produce synchronized shots from the multiple multiresolution camera cluster disposed on the DSLR camera and/or the high end DSC.

The above described technique is a hierarchical approach to depth map computations, which includes computing and saving depth maps for individual clusters at each stage of hierarchy and then use them in further stages of hierarchical computations of final depth maps. In this approach, each depth map is computed using a certain viewpoint. Viewpoint is defined as a position to which pixels from each camera are shifted in order to compute "Parallax". Viewpoint position can be center of a central camera in the multiple multiresolution camera cluster, however, viewpoint may be any position between cameras in the multiple multiresolution camera cluster. This technique allows to generate depth maps as viewed from an arbitrary position in the multiple multiresolution camera cluster. Further with this technique, more than one depth map may be generated using different viewpoints. Such generated depth maps may be stored and used in the next level hierarchical depth map computations. When the viewpoints are positioned along with Epipolar lines they can be used as additional samples for determining the actual position of the edges. Further this approach can assist in determine depths in occlusion areas. Furthermore, using multiple viewpoints for depth map computations can assist in selecting cameras in clusters having an optimal viewing, of particular pixels, which can further assist in determining the depths for pixels, which are occluded from other cameras in the cluster. The above described approach uses depth maps and images viewed from different viewpoints in the second stage of hierarchy for more accurate computation of occlusions and for an improved determination of where the actual positioning of the edges are.

High speed video can be generated by combining one or two camera clusters and the central camera, as shown in FIGS. 2-4. This can be achieved by capturing images from each cluster in multiple multiresolution camera clusters at substantially same time and combining the images into a single sequence to produce 2× and 3× speed videos.

FIG. 15 shows a camera cluster and a central camera 4. As shown in FIG. 15, all the cameras 1-6 form a single cluster. In an example, depth map may be generated to warp the image of camera 3 to viewpoint of central camera 4 and further to generate a sequence of images time shifted with images generated by the central camera 4. Combining the two sequences can generate the 2× speed video.

FIG. 16 shows two camera clusters, i.e., cameras 2,3,4, and 8 are forming cluster 1 and cameras 1,5,6 and 7 are forming cluster 2. Depth maps can be generated for both the clusters 1 and 2 and then images from cameras 4 and 5 are warped to a viewpoint positioned between these cameras to generate sequences of time shifted images for these clusters 1 and 2. Merging the two sequences results in generating a 2× speed video.

FIG. 17 shows two camera clusters and a central camera. As shown in FIG. 17, cameras 2, 3, 4 and 9 form cluster 1 and cameras 1, 6, 7, and 8 form cluster 2. Depth maps may be produced for both the clusters 1 and 2 and then images from cameras 4 and 5 to the viewpoint of central camera 5 can be warped to the depth maps to generate three sequences of time shifted images for the two clusters 1 and 2 and the central camera. Merging the three sequences result in generating a 3× speed video.

Process 500 for generating 3D images using multiresolution camera cluster is also further explained above with reference to the system diagram 100 shown in FIG. 1.

In an example embodiment, components/modules of 3D image generation module 160 are implemented using standard programming techniques. In other embodiments, 3D image generation module may be implemented as instructions processed by a processor that executes as one of other programs.

Furthermore, in some embodiments, some or all of the components of 3D image generation module 160 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs";), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a digital video disc (DVD) or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for optimizing guest OS utilization cost in a processor based licensing model in a virtualized datacenter are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule central processing unit (CPU) time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

What is claimed is:

1. A method for depth map generation, comprising:
   capturing images using multiple multiresolution camera clusters, wherein the multiple multiresolution camera clusters including a central camera, wherein the central camera having a high-resolution to capture a high-resolution image and remaining cameras in the multiple multiresolution camera clusters having mid and low-resolutions to capture associated mid-resolution and low-resolution images;
   down-scaling the high-resolution image and the mid-resolution images to be substantially equal to the captured low-resolution images;
   generating multiple low-resolution depth maps for each cluster using multiple viewpoints of the central camera and the down-scaled images;
   refining the generated multiple low-resolution depth maps;
   generating a low-resolution central camera depth map using the refined multiple low-resolution depth maps;
   upscaling the low-resolution images to be substantially equal to the mid-resolution images;
   generating multiple mid-resolution depth maps for each cluster using the multiple view points and the up-scaled mid-resolution images;
   generating an initial mid-resolution depth map using the generated multiple mid-resolution depth maps and a down-scaled central image;
   refining iteratively the generated initial mid-resolution depth map;
   upscaling central cluster images to high-resolution images;
   refining iteratively a high-resolution depth map using the refined initial mid-resolution depth map, the low-resolution central camera depth map, and the up-scaled central cluster images; and
   generating a final high-resolution depth map using the iteratively refined high-resolution depth map.

2. The method of claim 1, further comprising:
   generating a 3D image of the captured images using the generated final high-resolution depth map and the captured images.

3. The method of claim 1, further comprising:
   disposing multiple multiresolution camera, clusters including the central camera having the high-resolution and the remaining cameras, having a plurality of resolutions that are lower than the high-resolution, that are disposed substantially around the central camera.

4. The method of claim 1, wherein the central camera having a resolution that is higher than the remaining cameras in the multiple multiresolution camera clusters having mid and low-resolutions.

5. The method of claim 4, wherein the remaining cameras in the multiple multiresolution camera clusters having the plurality of resolutions that are different and lower from the central camera having the higher resolution.

6. The method of claim 5, wherein a central camera of each cluster having a higher resolution than the resolutions of the remaining cameras in the multiple multiresolution camera clusters.

7. The method of claim 1, wherein the remaining cameras in the multiple multiresolution camera clusters are radially disposed around the central camera.

8. The method of claim 1, where in the central camera and the remaining cameras in the multiple multiresolution camera clusters are formed by directly disposing the camera lenses on a semiconductor wafer chip.

9. The method of claim 1, wherein the central camera and the remaining cameras in the multiple multiresolution camera clusters are disposed in a mobile computing device.

10. The method of claim 9, wherein the mobile computing device comprises a smart phone, a tablet, a portable digital camera, and/or a personal computer.

11. The method of claim 1, wherein the multiple multi-resolution cameras are disposed on a flash of digital single lens reflex (DSLR) or a high end digital still camera (DSC) and further configured to use flash interface to produce synchronized shots from the multiple multiresolution cameras disposed on the DSLR camera and/or the high end DSC.

12. A non-transitory computer-readable storage medium comprising instructions for depth map generation using multiple multiresolution camera clusters, the instructions executable by a processor to:
   capture images using the multiple multiresolution camera clusters, wherein the multiple multiresolution camera clusters including a central camera, wherein the central camera having a high-resolution to capture a high-resolution image and remaining cameras in the multiple multiresolution camera clusters having mid and low-resolutions to capture associated mid-resolution and low-resolution images;
   down-scale the high-resolution image and the mid-resolution images to be substantially equal to the captured low-resolution images;
   generate multiple low-resolution depth maps for each cluster using multiple viewpoints of the central camera and the down-scaled images;
   refine the generated multiple low-resolution depth maps;
   generate a low-resolution central camera depth map using the refined multiple low resolution depth maps;
   upscale the low-resolution images to be substantially equal to the mid-resolution images;
   generate multiple mid-resolution depth maps for each cluster using the multiple view points and the up-scaled mid-resolution images;
   generate an initial mid-resolution depth map using the generated multiple mid-resolution depth maps and a down-scaled central image;
   refine iteratively the generated initial mid-resolution depth map;
   upscale central cluster images to high-resolution images;
   refine iteratively a high-resolution depth map using the refined initial mid-resolution depth map and the up-scaled central cluster images; and
   generate a final high-resolution depth map using the iteratively refined high-resolution depth map.

13. The non-transitory computer-readable storage medium of claim 12, further comprising instructions to generate a 3D image of the captured images using the final generated high-resolution depth map and the captured images.

14. The non-transitory computer-readable storage medium of claim 12, wherein the central camera having a higher resolution than the remaining cameras in the multiple multiresolution camera clusters having mid and low-resolutions.

15. The non-transitory computer-readable storage medium of claim 14, wherein the remaining cameras in the multiple multiresolution camera clusters having a plurality of resolutions that are different and lower from the central camera having the higher resolution.

16. The non-transitory computer-readable storage medium of claim 14, wherein a central camera of each camera cluster having a higher resolution than the resolutions of the remaining cameras in the multiple multiresolution camera clusters.

17. The non-transitory computer-readable storage medium of claim 12, wherein the remaining cameras in the multiple multi-resolution camera clusters are radially disposed around the central camera.

18. An image processing device for depth map generation, comprising:
   multiple multiresolution camera clusters;
   a processor coupled to the multiple multiresolution camera clusters, wherein the multiple multiresolution cameras include a central camera, and wherein the central camera having a high-resolution to capture a high-resolution image and remaining cameras in the multiple multiresolution camera clusters having mid and low-resolutions to capture associated mid-resolution and low-resolution images; and
   memory coupled to the processor, and wherein the memory includes a 3D image generation module that is configured to:
      capture images using the multiple multiresolution camera clusters;
      down-scale the resolution of high-resolution image and the mid-resolution images to be substantially equal to the captured low-resolution images;
      generate multiple low-resolution depth maps for each cluster using multiple viewpoints of the central camera and the down-scaled images;
      refine the generated multiple low-resolution depth maps;
      generate a low-resolution central camera depth map using the refined multiple low-resolution depth maps;
      upscale the low-resolution images to be substantially equal to the mid-resolution images;
      generate multiple mid-resolution depth maps for each cluster using the multiple view points and the up-scaled mid-resolution images;
      generate an initial mid-resolution depth map using the generated multiple mid-resolution depth maps and the down-scaled central image;
      refine iteratively the generated initial mid-resolution depth map;
      upscale central cluster images to high-resolution images;
      refine iteratively a high-resolution depth map using the refined initial mid-resolution depth map, the low-resolution central camera depth map, and the up-scaled central cluster images; and
      generate a final high-resolution depth map using the iteratively refined high-resolution depth map.

19. The image processing device of claim 18, wherein the 3D image generation module is further configured to generate a 3D image of the captured images using the generated final high-resolution depth map and the captured images.

20. The image processing device of claim 18, wherein the central camera having a higher resolution than the remaining cameras in the multiple multiresolution camera clusters.

21. The image processing device of claim 19, wherein the remaining cameras in the multiple multiresolution camera clusters having a plurality of resolutions that are different and lower from the central camera having the higher resolution.

22. The image processing device of claim 18, wherein a central camera of each cluster having a higher resolution than the resolutions of the remaining cameras in the multiple multiresolution camera clusters.

23. The image processing device of claim 18, wherein the remaining cameras in the multiple multiresolution camera clusters are radially positioned substantially around the central camera.

24. The image processing device of claim 18, wherein the multiple multiresolution camera clusters are formed by using a cluster of individual camera modules.

25. The image processing device of claim 18, wherein the central camera and the remaining cameras in the multiple multiresolution camera clusters are formed by directly disposing the camera lenses on a semiconductor wafer chip.

26. The image processing device of claim 18, wherein the multiple multiresolution camera clusters are formed by placing disassembled lenses and sensors in two separate machined holders.

27. The image processing device of claim 18, wherein the central camera and the remaining cameras in the multiple multiresolution camera clusters are disposed in a mobile computing device.

28. The image processing device of claim 18, wherein the mobile computing device comprises a smart phone, a tablet, a portable digital camera, and/or a personal computer.

29. The image processing device of claim 18, wherein the multiple multiresolution cameras are disposed on a flash of digital single lens reflex (DSLR) or a high end digital still camera (DSC) and further configured to use flash interface to produce synchronized shots from the multiple multiresolution cameras disposed on the DSLR camera and/or the high end DSC.

30. The image processing device of claim 18, wherein the captured images are 2D captured images.

31. The image processing device of claim 18, wherein the 3D image generation module is further configured to generate a high dynamic range (HDR) images using different exposure times for each cluster in the multiple camera clusters for use with overexposed and underexposed areas in the depth maps.

32. The image processing device of claim 31, wherein the 3D image generation module is further configured to antialiasing the HDR images using pixels from captured images in each cluster and the high resolution depth map.

33. The image processing device of claim 18, wherein the 3D image generation module is configured to generate depth maps and 3D images using multiple camera clusters, cluster hierarchy, and multiple viewpoints per cluster for improved occlusion handling and to get better definition of edges.

* * * * *